(12) United States Patent
Shimokawa

(10) Patent No.: US 10,090,711 B2
(45) Date of Patent: Oct. 2, 2018

(54) POWER TRANSMISSION APPARATUS AND POWER TRANSMISSION METHOD

(71) Applicant: FUJITSU LIMITED, Kawasaki-shi, Kanagawa (JP)

(72) Inventor: Satoshi Shimokawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 204 days.

(21) Appl. No.: 14/962,594

(22) Filed: Dec. 8, 2015

(65) Prior Publication Data

US 2016/0094053 A1  Mar. 31, 2016

Related U.S. Application Data

(63) Continuation of application No. PCT/JP2013/067235, filed on Jun. 24, 2013.

(51) Int. Cl.
*H02J 50/12* (2016.01)
*H02J 7/02* (2016.01)
*H02J 5/00* (2016.01)

(52) U.S. Cl.
CPC ............ *H02J 50/12* (2016.02); *H02J 5/005* (2013.01); *H02J 7/025* (2013.01)

(58) Field of Classification Search
CPC ................................... H02J 50/00; H02J 7/00
See application file for complete search history.

(56) References Cited

U.S. PATENT DOCUMENTS 8,258,652 B2 *  9/2012 Sekino ................... H02J 7/025
307/104

8,519,569 B2 *  8/2013 Shimokawa .......... B60L 11/182
307/104

(Continued)

FOREIGN PATENT DOCUMENTS

JP  2010-239690  10/2010
JP  2010-239769  10/2010

(Continued)

OTHER PUBLICATIONS

JPOA—Office Action dated Jul. 12, 2016 issued with respect to the corresponding Japanese Patent Application No. 2015-523683, with partial English translation.

(Continued)

*Primary Examiner* — Hai L Nguyen
(74) *Attorney, Agent, or Firm* — Fujitsu Patent Center

(57) ABSTRACT

A power transmission apparatus includes a primary coil connected to an AC source; a primary resonance coil configured to receive power from the primary coil; a secondary resonance coil configured to receive power from the primary resonance coil by magnetic field resonance occurred between the primary resonance coil and the secondary resonance coil; a secondary coil configured to receive power from the secondary resonance coil; a phase difference detector detect a phase difference between a phase of voltage supplied to the primary resonance coil and a phase of current flowing through the primary resonance coil; a variable capacitor provided on the primary resonance coil; and a determination part determining a coupling degree between the primary resonance coil and the secondary resonance coil based on a change degree of the phase difference relative to a change amount of capacitance when the capacitance of the variable capacitor changes.

10 Claims, 14 Drawing Sheets

(56) References Cited

U.S. PATENT DOCUMENTS

| | | |
|---|---|---|
| 9,634,493 B2* | 4/2017 | Shimokawa ............ H02J 5/005 |
| 2010/0244577 A1 | 9/2010 | Shimokawa |
| 2010/0244580 A1 | 9/2010 | Uchida et al. |
| 2012/0098348 A1 | 4/2012 | Inoue et al. |
| 2013/0015720 A1 | 1/2013 | Shimokawa et al. |
| 2015/0326028 A1 | 11/2015 | Suzuki et al. |

FOREIGN PATENT DOCUMENTS

| | | |
|---|---|---|
| JP | 2010-252446 | 11/2010 |
| JP | 2013-81331 | 5/2013 |
| WO | 2011099071 | 8/2011 |
| WO | 2013042224 | 3/2013 |

OTHER PUBLICATIONS

International Search Report of International Application No. PCT/JP2013/067235 dated Jul. 23, 2013.

* cited by examiner

| COIL | OUTER DIAMETER | NUMBER OF TURNS | PITCH |
|---|---|---|---|
| PRIMARY SIDE COIL 12 | φ20mm | 1 | – |
| PRIMARY SIDE RESONANCE COIL 13 | φ40mm | 5 | 0.8mm |
| SECONDARY SIDE RESONANCE COIL 22 | φ30mm | 5 | 0.8mm |
| SECONDARY SIDE COIL 23 | φ20mm | 1 | – |

D=30mm WEAK COUPLING kQ=3.1 (k=0.02, Q=145)

D=20mm MEDIUM COUPLING kQ=8.3 (k=0.06, Q=145)

D=10mm STRONG COUPLING kQ=29 (k=0.2, Q=144)

D=30mm WEAK COUPLING kQ=3.1 (k=0.02, Q=145)

D=20mm MEDIUM COUPLING kQ=8.3 (k=0.06, Q=145)

D=10mm STRONG COUPLING kQ=29 (k=0.2, Q=144)

POWER TRANSMISSION APPARATUS AND POWER TRANSMISSION METHOD

CROSS-REFERENCE TO RELATED APPLICATION

This application is a continuation application of International Application PCT JP2013/067235 filed Jun. 24, 2013 and designating the U.S., the entire contents of which are incorporated herein by reference.

FIELD

The embodiments discussed herein are related to a power transmission apparatus and a power transmission method.

BACKGROUND

Conventionally, there has been known a non-contact power supply facility which includes a transmission resonator to transmit power, without contact, to a receiving resonator by resonating with a receiving resonator of the receiving apparatus via an electromagnetic field, a power supply apparatus, in connection with the transmission resonator, to generate predetermined high-frequency voltage, and a control apparatus to control the power supply from the transmission resonator to the receiving resonator by controlling the power supply apparatus. In this non-contact power supply facility, the control apparatus performs the power supply control based on the frequency characteristics of impedance that varies depending on the distance between the transmission resonator and the receiving resonator (see, for example, Japanese Laid-open Patent Publication No. 2010-252446).

SUMMARY

According to an aspect of the present application, a power transmission apparatus includes: a primary coil connected to an AC source; a primary resonance coil configured to receive power from the primary coil by electromagnetic induction; a secondary resonance coil configured to receive power from the primary resonance coil by magnetic field resonance occurred between the primary resonance coil and the secondary resonance coil; a secondary coil configured to receive power from the secondary resonance coil by electromagnetic induction; a phase difference detector detecting a phase difference between a phase of voltage which is supplied to the primary resonance coil and a phase of current which flows through the primary resonance coil; a variable capacitor provided on the primary resonance coil; and a determination part determining a coupling degree between the primary resonance coil and the secondary resonance coil based on a change degree of the phase difference relative to a change amount of capacitance when the capacitance of the variable capacitor changes.

The object and advantages of the invention will be realized and attained by means of the elements and combinations particularly pointed out in the claims.

It is to be understood that both the foregoing general description and the following detailed description are exemplary and explanatory and are not restrictive of the invention as claimed.

DESCRIPTION OF EMBODIMENTS

In conventional non-contact power supply facilities, in order to obtain the impedance frequency characteristics, the frequency of the high-frequency power is changed.

The assignment of the frequency of the high-frequency power, however, is determined by law, etc. So, the frequency of the high-frequency power may not be changed freely. For example, in Japan, it is possible to use only the high-frequency power of assigned frequencies by the government (Ministry of Internal Affairs and Communications), but it is not possible to use the high-frequency power of the frequencies which are not assigned.

Due to such restrictions, it may not be possible to effectively perform power supply control in the conventional non-contact power supply facilities.

In this regard, according to an embodiment of the present invention, it may become possible to provide a power transmission apparatus and a power transmission method where power can be transmitted effectively.

In the following, power transmission apparatuses and power transmission methods according to embodiments of the present invention are described.

First Embodiment

Figure 1:
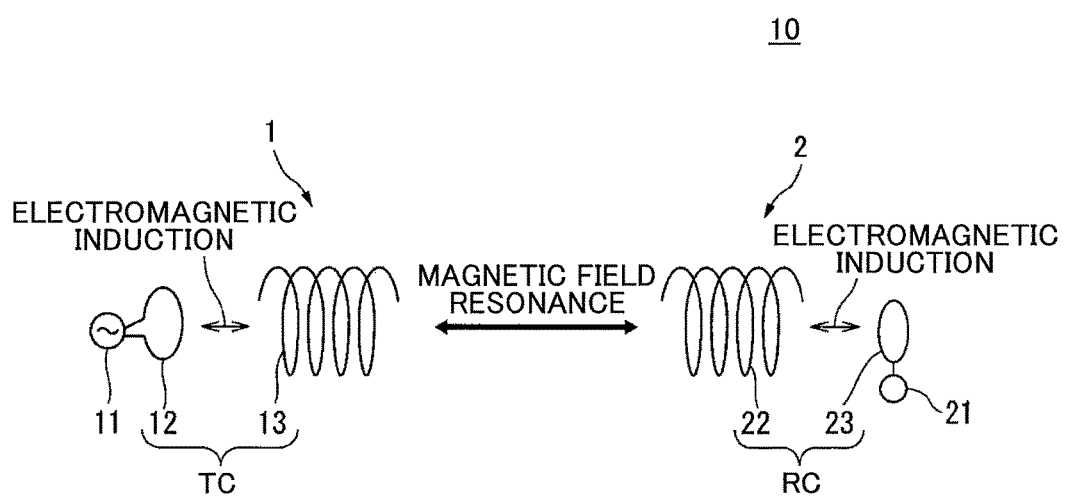
FIG. 1 illustrates an example of a power transmission system 10 including an electric power transmission apparatus according to a first embodiment.

FIG. 1 illustrates an electric power transmission system 10 (hereinafter simplified as "power transmission system 10") including an electric power transmission apparatus (hereinafter simplified as "power transmission apparatus") according to a first embodiment.

As illustrated in FIG. 1, the power transmission system 10 includes a power transmitter 1 on a primary (power transmission side) and a power receiver 2 on a secondary (power receiving side). The power transmission system 10 may include two or more power transmitters 1 and power receivers 2. In FIG. 1, note that a power transmission apparatus according to the first embodiment is omitted.

As illustrated in FIG. 1, the power transmitter 1 includes an Alternating-Current (AC) source 11 and a power transmission system coil "TC" which includes a primary coil 12 and a primary resonance coil 13. Further, the power receiver 2 includes a power receiving system coil "RC", which includes a secondary resonance coil 22 and a secondary coil 23, and a load device 21.

As illustrated in FIG. 1, between the power transmitter 1 to the power receiver 2, energy (power) is transmitted from the power transmitter 1 to the power receiver 2 by magnetic field resonance between the primary resonance coil (LC resonator) 13 and the secondary resonance coil (LC resonator) 22. Here, power from the primary resonance coil 13 to the secondary resonance coil 22 may also be transmitted by, for example, electric field resonance besides the magnetic field resonance. In the following, however, the magnetic field resonance is mainly described as examples.

Further, in this first embodiment, a case is described where the frequency of the alternating current (AC) voltage output from the AC source 11 is 6.78 MHz and the resonance frequency of the primary resonance coil 13 and the secondary resonance coil 22 is also 6.78 MHz.

Further, in the power transmission system coil "TC", power transmission from the primary coil 12 to the primary resonance coil 13 is performed by using electromagnetic induction. Similarly, in the power receiving system coil "RC", power transmission from the secondary resonance coil 22 to the secondary coil 23 is performed by using electromagnetic induction as well.

Figure 2:
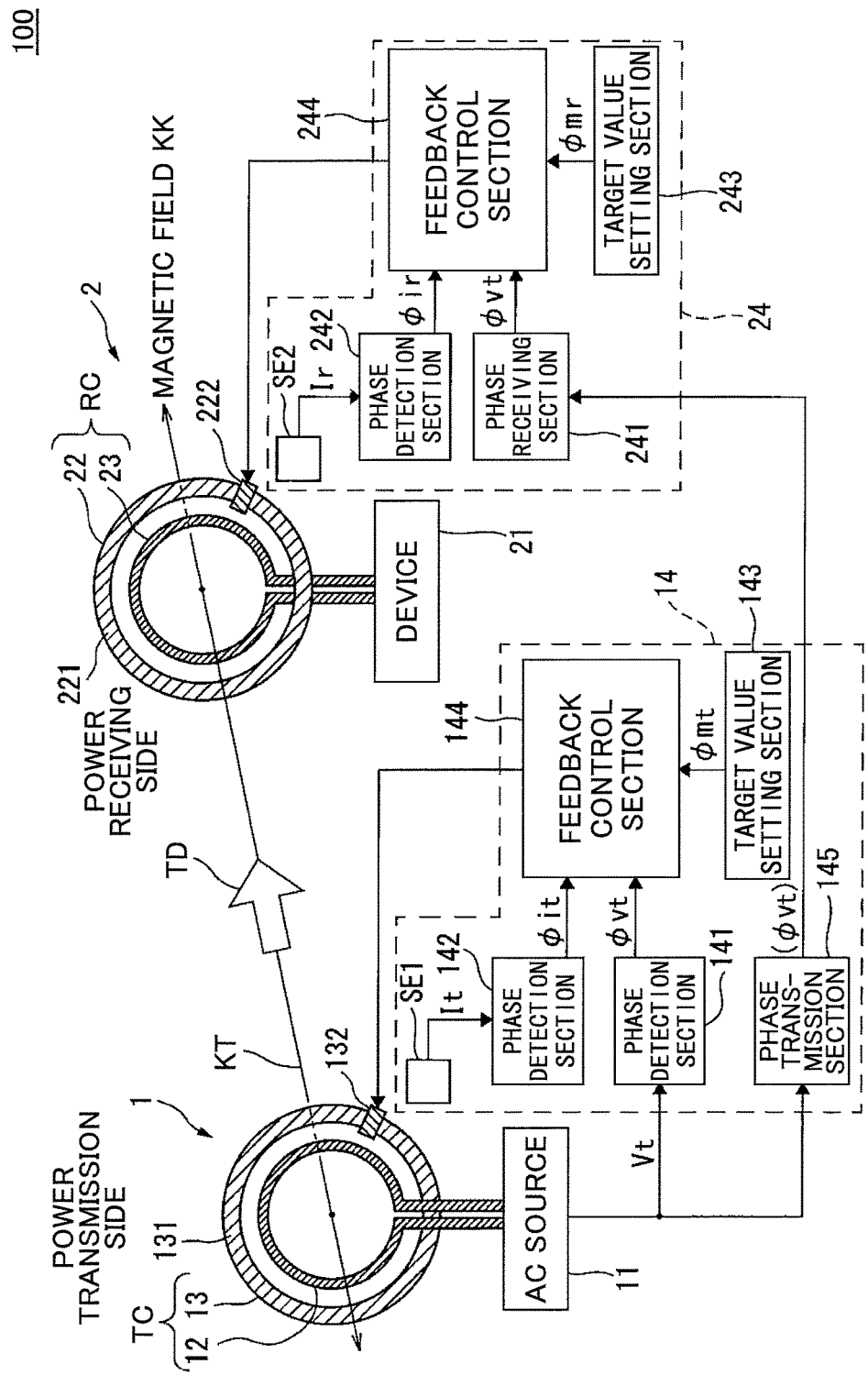
FIG. 2 illustrates an example of a power transmission apparatus 100 according to the first embodiment.

FIG. 2 illustrates an example of an electric power transmission apparatus 100 (hereinafter simplified as a "power transmission apparatus 100") according to the first embodiment. The power transmission apparatus 100 of FIG. 2 is included in the power transmission system 10 of FIG. 1. As illustrated in FIG. 2, the power transmission apparatus 100 includes the power transmission system coil "TC", the power receiving system coil "RC", the AC source 11, a power transmission side control circuit 14, a device as a load (load device 21), and a power receiving side control circuit 24.

The power transmission apparatus 100 according to the first embodiment includes a determination section (determination part) which determines a coupling degree between the primary resonance coil 13 and the secondary resonance coil 22. The determination section is omitted in FIG. 2 but is described below with reference to FIG. 3.

As described above, the power transmission system coil "TC" includes the primary coil 12 and the primary resonance coil 13. For example, the primary coil 12 is a coil in which a metal wire line such as a copper wire line or an aluminum wire line is wound several times in a circular manner, and an AC voltage (high-frequency voltage) from the AC source 11 is applied to both ends of the primary coil 12.

The primary resonance coil 13 includes a coil 131 in which, for example, a metal wire line such as a copper wire line or an aluminum wire line is wound in a circular manner and a capacitor 132 which is connected to both ends of the coil 131, so that a resonance circuit is formed. The resonance frequency "f0" is given by the following Formula (1)

$$f0 = 1/\{2\pi(LC)^{1/2}\} \tag{1}$$

Here, the symbol "L" denotes the inductance of the coil 131 and the symbol "C" denotes the capacitance of the capacitor 132.

For example, the coil 131 of the primary resonance coil 13 is a single-turn (one-turn) coil. Further, as the capacitor 132, various types of capacitors may be used, but it is preferable that the loss is as small as possible and the withstand voltage is sufficient. The capacitor 132 is an example of a variable capacitor.

In the power transmission apparatus 100 of FIG. 2, in order to change the resonance frequency, a variable capacitor is used as the capacitor 132. As the variable capacitor, for example, a variable capacitive device formed by using a Micro Electro Mechanical System (MEMS) technique or a variable capacitive device using a semiconductor (i.e., a varactor) may be used.

The primary coil 12 and the primary resonance coil 13 are disposed, for example, on the same plane and in a concentric manner so as to be closely electromagnetically coupled to each other. That is, the primary coil 12 and the primary resonance coil 13 are disposed in a manner that the primary coil 12 is arranged on the inner side of the primary resonance coil 13. Otherwise, for example, the primary coil 12 and the primary resonance coil 13 may be disposed on the same axis with an appropriate distance therebetween.

Under this status, when an AC voltage is applied from the AC source 11 to the primary coil 12, due to electromagnetic induction caused by an alternating magnetic field generated in the primary coil 12, a resonance current flows in the primary resonance coil 13. That is, due to the electromagnetic induction, power is transmitted from the primary coil 12 to the primary resonance coil 13.

On the other hand, as described above, the power receiving system coil "RC" includes the secondary resonance coil 22 and the secondary coil 23. The secondary resonance coil 22 includes a coil 221 in which, for example, a metal wire line such as a copper wire line or an aluminum wire line is wound in a circular manner and a capacitor 222 which is connected to both ends of the coil 221. The resonance frequency "f0" of the secondary resonance coil 22 is given by the above Formula (1) based on the inductance of the coil 221 and the capacitance of the capacitor 222.

For example, the coil 221 of the secondary resonance coil 22 is a single-turn coil. Further, as described above, various types of capacitors may be used as the capacitor 222. In the power transmission apparatus 100 of FIG. 2, a variable capacitor is used as the capacitor 222 to vary the resonance frequency.

As the variable capacitor, similar to the capacitor 132, for example, a variable capacitive device formed by using a MEMS technique or a varactor using a semiconductor may be used.

For example, the secondary coil 23 is a coil in which a metal wire line such as a copper wire line or an aluminum wire line is wound several times in a circular manner, and the load device 21 is connected to both ends of the secondary coil 23. Here, the load device 21 is, for example, a battery to be used as a power source to the power receiver 2 or a circuit to charge the battery.

The secondary resonance coil 22 and the secondary coil 23 are disposed, for example, on the same plane and in a concentric manner so as to be closely electromagnetically coupled to each other. That is, the secondary resonance coil 22 and the secondary coil 23 are disposed in a manner that the secondary coil 23 is arranged on the inner side of the secondary resonance coil 22. Otherwise, for example, the secondary resonance coil 22 and the secondary coil 23 may be disposed on the same axis with an appropriate distance therebetween.

Under this status, when a resonance current flows through the secondary resonance coil 22, due to electromagnetic induction generated by the alternating magnetic field produced by the resonance current, a current flows through the secondary coil 23. That is, due to the electromagnetic induction, power (electric power) is transmitted from the secondary resonance coil 22 to the secondary coil 23.

Here, power is wirelessly transmitted from the power transmission system coil "TC" to the power receiving system coil "RC" by magnetic field resonance. Therefore, as illustrated in FIG. 2, the power transmission system coil "TC" and the power receiving system coil "RC" are arranged within an appropriate distance from each other in a manner such that the coil surfaces thereof are parallel to each other and the coil axis centers thereof are the same as each other or the coil axis centers are not so separated from each other.

As illustrated in FIG. 2, in the power transmission apparatus 100, the direction along the coil axis center "KT" corresponds to a main radiation direction of the magnetic field "KK", and the direction from the power transmission system coil "TC" to the power receiving system coil "RC" is the transmission direction "TD".

Here, when both the resonance frequency "ft" of the primary resonance coil 13 and the resonance frequency "fr" of the secondary resonance coil 22 are equal to the frequency "fd" of the AC source 11, the maximum power is transmitted.

Further, in the power transmission apparatus 100 of FIG. 2, the power transmission side control circuit 14 and the power receiving side control circuit 24 control the resonance frequencies "ft" and "fr", respectively, by using the phase "φvt" of the AC source 11 and the phases "φit" and "φir" of the currents flowing through the primary resonance coil 13 and the secondary resonance coil 22. Here, the resonance frequencies "ft" and "fr" are controlled to be equal to the frequency "fd" of the AC source 11.

Further, the power transmission side control circuit 14 detects the phase "φvt" of the voltage "Vt" which is applied to the power transmission system coil "TC" and the phase "φit" of the current "It" which flows through the power transmission system coil "TC", and performs variable control on the resonance frequency "ft" of the power transmission system coil "TC" so that the phase difference "Δφt" (between the phase "φvt" and the phase "φit") is equal to a predetermined target value "φmt".

To that end, the power transmission side control circuit 14 includes a current detection sensor SE1, phase detection sections 141 and 142, a target value setting section 143, a feedback control section 144, and a phase transmission section 145.

The current detection sensor SE1 detects the current "It" which flows through the primary resonance coil 13. As the current detection sensor SE1, for example, a Hall element, a magnetoresistive element, or a detection coil may be used. For example, the current detection sensor SE1 outputs a voltage signal corresponding to the waveform of the current "It".

The phase detection section 141 detects the phase "φvt" of the voltage "Vt" which is applied to the primary coil 12, and, for example, outputs a voltage signal corresponding to the waveform of the voltage "Vt". Here, the phase detection section 141 may directly output the voltage "Vt" or may output a voltage divided by using appropriate resistors. In this regard, the phase detection section 141 may be a simple wire line or one or more resistance elements.

The phase detection section 142 detects the phase "φit" of the current "It" which flows through the primary resonance coil 13 based on the output from the current detection sensor SE1, and, for example, outputs a voltage signal corresponding to the waveform of the current "It". Here, the phase detection section 142 may directly output the output from the current detection sensor SE1. In this case, the current detection sensor SE1 may include the function of the phase detection section 142.

The target value setting section 143 sets and memorizes the target value "φmt" of the phase difference "Δφt". To that end, the target value setting section 143 includes (or is equipped with) a memory to store the target value "φmt". As the target value "φmt", for example, "−180° (−π radian)" or "a value obtained by adding an appropriate correction value "a" to −180°" is set.

Further, in setting the target value "φmt", the target value "φmt" may be selected from a group consisting of one or more data stored in advance. Otherwise, for example, the setting the target value "φmt" may be done by the instructions from a Central Processing Unit (CPU) or via a keyboard.

The feedback control section 144 performs variable control on the resonance frequency "ft" of the primary resonance coil 13 so that the phase difference "Δφt" between the phase "φvt" of the voltage "Vt" of the AC source 11 and the phase "φit" of the current "It" of the primary resonance coil 13 is equal to the target value "φmt".

The phase transmission section 145 wirelessly transmits the information of the phase "φvt" of the voltage "Vt", which is applied to the primary coil 12, as an analog or digital signal to the power receiving side control circuit 24. In this case, for example, in order to increase the signal-to-noise (S/N) ratio, a voltage signal which is equal to an integral multiple of the voltage signal corresponding to the voltage "Vt" may be transmitted.

The power receiving side control circuit 24 detects the phase "φvt" of the voltage "Vt" which is applied to the power transmission system coil "TC" and the phase "φir" of the current "Ir" which flows through the power receiving system coil "RC", and performs variable control on the resonance frequency "fr" of the power receiving system coil "RC" so that the phase difference "Δφr" (between the phase "φvt" and the phase "φir") is equal to a predetermined target value "φmr".

To that end, the power receiving side control circuit 24 includes a current detection sensor SE2, a phase receiving section 241, a phase detection section 242, a target value setting section 243, and a feedback control section 244.

The current detection sensor SE2 detects the current "Ir" which flows through the secondary resonance coil 22. As the current detection sensor SE2, for example, a Hall element, a magnetoresistive element, or a detection coil may be used.

For example, the current detection sensor SE2 outputs a voltage signal corresponding to the waveform of the current "Ir".

The phase receiving section 241 receives and outputs the information of the phase "φvt" which is transmitted from the phase transmission section 145. In a case where the voltage signal is multiplied by the phase transmission section 145, the phase receiving section 241 performs frequency dividing on the received signal to restore the signal. For example, the phase receiving section 241 outputs the voltage signal which corresponds to the voltage "Vt"

The phase detection section 242 detects the phase "φir" of the current "Ir" which flows through the secondary resonance coil 22, and outputs, for example, a voltage signal which corresponds to the waveform of the current "Ir". Here, the phase detection section 242 may directly output the output from the current detection sensor SE2. In this case, the current detection sensor SE1 may include the function of the phase detection section 242.

The target value setting section 243 sets and memorizes the target value "φmr" of the phase difference "Δφr". To that end, the target value setting section 243 includes (or is equipped with) a memory to store the target value "φmr". As the target value "φmr", for example, a value obtained by adding "−90° (−π/2 radian)" to the target value "φmt" in the power transmission side control circuit 14 is set.

That is, as the target value "φmr", for example, "−270° (−3π/2 radian)" or "a value obtained by adding the appropriate correction value "a" to −270°" is set. Further, the setting method of the target value "φmr" is similar to that of the target value "φmt".

The feedback control section 244 performs variable control on the resonance frequency "fr" of the secondary resonance coil 22 so that the phase difference "Δφr" between the phase "φvt" of the voltage "Vt" of the AC source 11 and the phase "φir" of the current "Ir" of the secondary resonance coil 22 is equal to the target value "φmr".

Further, the target value setting section 143 and the feedback control section 144 in the power transmission side control circuit 14 are an example of a resonance frequency controller (controller). Similarly, the target value setting section 243 and the feedback control section 244 in the power receiving side control circuit 24 are an example of the resonance frequency controller (controller).

Further, as described above, the power transmission system coil "TC" and the power receiving system coil "RC" are arranged within an appropriate distance from each other in a manner such that the coil surfaces thereof are parallel to each other and the coil axis centers thereof are the same as each other or the coil axis centers are not so separated from each other as illustrated in FIG. 2.

Note that however since the power transmission system coil "TC" is disposed on the side of the apparatus which transmits power and the power receiving system coil "RC" is disposed on the side of the apparatus which receive the power, the positional relationship between the primary resonance coil 13 of the power transmission system coil "TC" and the secondary resonance coil 22 of the power receiving system coil "RC" is not always constant and may vary.

The distance by which power can be transmitted in power transmission by magnetic field resonance is longer than that in power transmission by electromagnetic induction. Therefore, in power transmission by magnetic field resonance, it is possible to transmit power even when the power transmission side and the power receiving side are more separated from each other.

Due to this, in some cases where power is transmitted by magnetic field resonance, there is some distance between the power transmission side and the power receiving side. Further, depending on the purpose (use application) of the power transmission apparatus 100, the distance between the primary resonance coil 13 and the secondary resonance coil 22 may vary whenever power is transmitted from the power transmission side to the power receiving side.

Further, the coupling degree between the primary resonance coil 13 to the secondary resonance coil 22 varies depending on the distance from each other.

In light of the above, in the power transmission apparatus 100 according to the first embodiment determines the coupling degree between the primary resonance coil 13 to the secondary resonance coil 22 to optimize the power transmission efficiency in accordance with the coupling degree between the primary resonance coil 13 to the secondary resonance coil 22.

Figure 3:
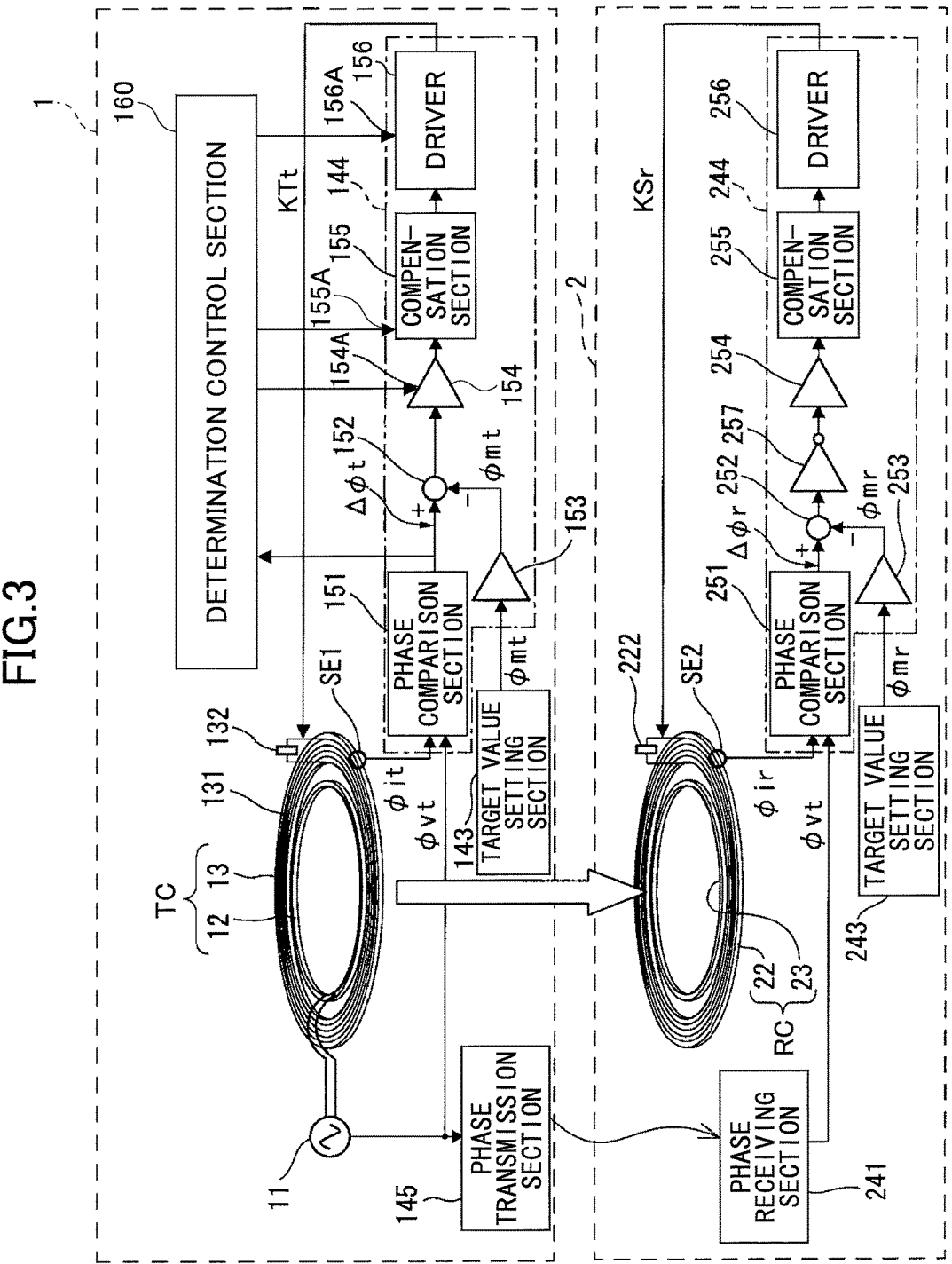
FIG. 3 is an example block diagram of the power transmission apparatus 100 in FIG. 2.

FIG. 3 is an example functional block diagram of the control system of the power transmission apparatus 100 in FIG. 2. Specifically, FIG. 3 illustrates details of the feedback control section 144 and a determination control section 160 of the power transmitter 1 and the feedback control section 244 of the power receiver 2.

For simplification purposes, in the block diagram of FIG. 3, the descriptions of the phase detection sections 141, 142, and 242 and the phase receiving section 241 in FIG. 2 are omitted. That is, in FIG. 3, the phase "φit" of the current "It" which flows through the primary resonance coil 13 is output directly from the current detection sensor SE1. However, for example, the phase "φit" may be output via the phase detection section 142 in the feedback control section 144.

As illustrated in FIG. 3, the feedback control section 144 includes a phase comparison section 151, an addition section 152, gain adjustment sections 153 and 154, a compensation section 155, and a driver 156.

The phase comparison section 151 compares the phase "φit" of the current "It" detected by the current detection sensor SE1 with the phase "φvt" of the voltage "Vt" of the AC source 11, and outputs the signal indicating the phases difference "Δφt" between the "φit" and the "φvt". The signal indicating the phases difference "Δφt" output from the phase comparison section 151 is input into the addition section 152 and the determination control section 160. The phase comparison section 151 is an example of a phase difference detector.

The addition section 152 subtracts the target value "φmt", which is set in the target value setting section 143, from the phase difference "Δφt" (i.e., the addition section 152 adds the reversed target value "φmt" to the phase difference "Δφt"). That is, when the phase difference "Δφt" is equal to the target value "φmt", the output of the addition section 152 becomes zero.

The output of the addition section 152 is input into the gain adjustment section 154 and is further input into the compensation section 155. Here, the gain adjustment sections 153 and 154 adjust the gain relative to the value or data to be input or convert the data so that the control is performed properly.

Further, a gain signal from the determination control section 160 is input into an adjustment terminal 154A of the gain adjustment section 154. The gain of the gain adjustment section 154 is adjusted by the determination control section 160.

For example, the compensation section 155 defines the gain relative to a low frequency component. That is, for example, the feedback control section 144 is regarded as a servo system which performs feedback control on the MEMS variable capacitive device which is the capacitor 132.

Therefore, in the compensation section 155, an appropriate servo filter is used for stabilizing and increasing speed and accuracy of the servo system. Further, in such a servo system, for example, a filter circuit or a differentiation and integration circuit may appropriately be used to conduct a Proportional Integral Derivative Controller (PID) operation.

Further, an on/off control terminal 155A of the compensation section 155 is connected to the determination control section 160. The compensation section 155 does not output an output signal while an off signal from the determination control section 160 is input into the on/off control terminal 155A. As a result, the feedback control is not performed. On the other hand, the compensation section 155 outputs an output signal while an ON signal from the determination control section 160 is input into the on/off control terminal 155A. As a result, the feedback control is performed.

For example, the driver 156 outputs a control signal "KTt" to the MEMS variable capacitive device which is the capacitor 132, so as to control the capacitance of the MEMS variable capacitive device. A signal from the determination control section 160 in order to adjust the capacitance of the capacitor 132 is input to the control terminal 156A of the driver 156.

Here, for example, the MEMS variable capacitive device (MEMS variable capacitor) is formed so that the capacitance thereof is changed by using the gap change caused by the bending generated by electrostatic suction power due to the voltage applied between the upper and lower electrodes formed on the glass substrate.

Further, the MEMS variable capacitive device (capacitor 132) may have an electrode for the capacitor and an electrode for driving separately. Further, since the relationship is not linear between the voltage applied to the electrode for driving and a change amount of the capacitance, for example, an appropriate calculation for the conversion or table conversion is performed in the driver 156.

The determination control section 160 is an example of the determination part. The determination control section 160 is connected to the output terminal of the phase comparison section 151, the adjustment terminal 154A of the gain adjustment section 154, the on/off control terminal 155A of the compensation section 155, and the control terminal 156A of the driver 156.

The determination control section 160 causes the driver 156 to change (sweep) the capacitance of the capacitor 132 while the compensation section 155 is set to off, and determines the coupling degree between the primary resonance coil 13 and the secondary resonance coil 22 based on a change degree of the phase difference between the phase "φit" of the current "It" detected by the phase comparison section 151 and the phase "φvt" of the voltage "Vt".

Further, based on the determination result, the determination control section 160 adjusts the gain of the gain adjustment section 154 or controls the on/off (setting) of the compensation section 155.

As illustrated in FIG. 3, the feedback control section 244 includes a phase comparison section 251, an addition section 252, gain adjustment sections 253 and 254, a compensation section 255, a driver 256, and a polarity reversion section 257.

Further, the operations of the those sections in the feedback control section 244 are substantially the same as those in the sections of the feedback control section 144. Therefore, the repeated descriptions thereof are herein omitted.

Further, for example, the power transmission side control circuit 14 and the power receiving side control circuit 24 in FIG. 2 and the feedback control section 144, the determination control section 160, and the feedback control section 244 can be realized by hardware or software or a combination thereof.

For example, those circuits (sections) can be realized by using a computer including a CPU, memories such as a Read-Only Memory (ROM) and a Random Access Memory (RAM), and other peripheral elements and by causing the CPU to execute an appropriate program. In this case, an appropriate hardware circuit is used concurrently.

Figure 4:
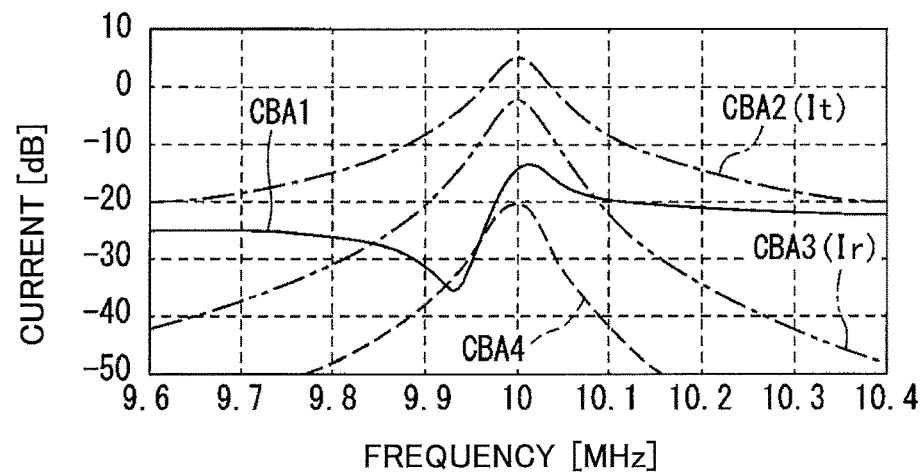
FIG. 4 illustrates control of a resonance frequency in the power transmission apparatus 100 of FIGS. 2 and 3.
Figure 5:
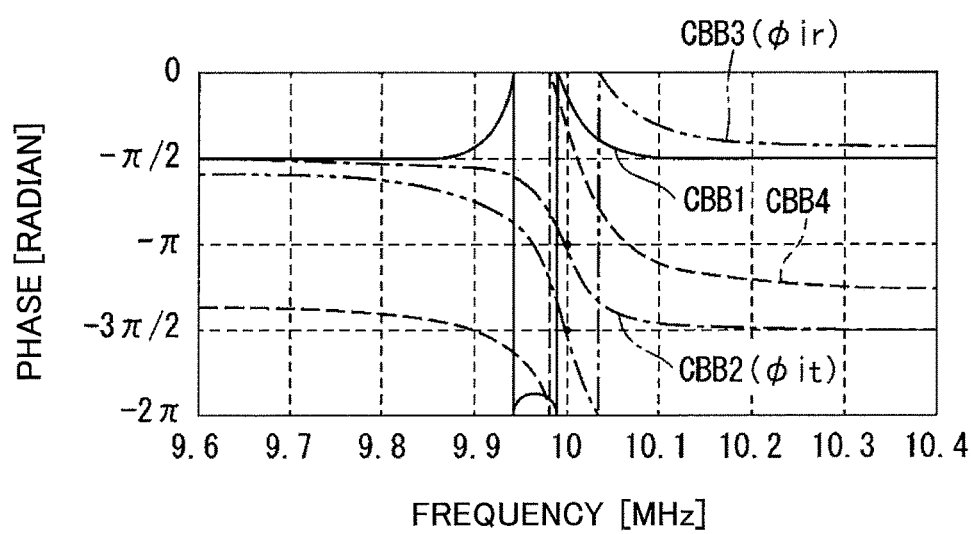
FIG. 5 illustrates the control of the resonance frequency in the power transmission apparatus 100 of FIGS. 2 and 3.

FIGS. 4 and 5 illustrate resonance frequency control in the power transmission apparatus 100 of FIGS. 2 and 3. Specifically, FIG. 4 is a graph where the horizontal axis denotes the frequency "f" MHz of the AC source 11 and the vertical axis denotes the amplitude (dB) of current "I" which flows through each of the coils. Further, FIG. 5 is a graph where the horizontal (lateral) axis denotes the frequency "f" MHz of the AC source 11 and the vertical axis denotes the phase "φ" (radian) of the current "I" which flows through each of the coils.

Further, the phase "φ" indicates the phase difference "Δφ" assuming that the phase "φvt" of the voltage "Vt" of the AC source 11 (i.e., the phase "φvt" of the voltage "Vt" applied to the primary coil 12) is the reference. That is, when the phase "φ" is equal to the phase "φvt", the value of the phase "φ" becomes zero. Further, when the value of the phase "φ" is negative, which indicates that the phase of the current is delayed relative to the phase "φvt" of the voltage "Vt" output from the AC source 11. On the other hand, when the value of the phase "φ" is positive, which indicates that the phase of the current is advanced relative to the phase "φvt" of the voltage "Vt" output from the AC source 11.

In the reference numerals "CBA1" through "CBA4" and "CBB1" through "CBB4", the figure "1", "2", "3", and "4" in the last digit denote the primary coil 12, the primary resonance coil 13, the secondary resonance coil 22, and the secondary coil 23, respectively.

Further, FIGS. 4 and 5 illustrate a case where the primary resonance coil 13 or the primary resonance coil 13 and the secondary resonance coil 22 are controlled so that the resonance frequency "ft" or the resonance frequencies "ft" and "fr", respectively, are equal to 10 MHz.

In this case, the target value "φmt" of the target value setting section 143 is set to "−π radian (−180°)" and the target value "φmr" of the target value setting section 243 is set to "−3π/2 radian (−270°)".

That is, the target value "φmr" is set to "φmt−π/2" which is delayed from the target value "φmt" by π/2.

As illustrated in the curve line "CBA2" of FIG. 4, the current "It" of the primary resonance coil 13 is maximum at 10 MHz where the resonance frequency "ft" of the current "It" of the primary resonance coil 13 is equal to the frequency "fd" of the AC source 11. Further as illustrated in the curve line "CBB2" of FIG. 5, the phase "φit" of the current "It" of the primary resonance coil 13 is "−π" at 10 MHz which is the resonance frequency "ft", which corresponds to the target value "φmt".

Here, the primary resonance coil 13 can be regarded as a series resonance circuit when viewed from the primary coil 12, so that when the frequency "fd" is lower than the resonance frequency "ft", the impedance becomes capacitive and the phase approaches "−π/2", and when the frequency "fd" is higher than the resonance frequency "ft", the impedance becomes inductive and the phase approaches "−3π/2".

As described above, the phase "φit" of the current "It" which flows through the primary resonance coil 13 greatly changes near the resonance frequency "ft". By controlling the phase "φit" (i.e., the phase difference "Δφt") so as to be equal to "−π", it becomes possible that the resonance frequency "ft" of the primary resonance coil 13 is accurately equal to the frequency "fd" of the voltage "Vt".

Further, as illustrated in the curve line "CBA1" of FIG. 4, the current "I" which flows through the primary coil 12 is also maximum at the resonance frequency "ft". Further, as illustrated in the curve line "CBB1" of FIG. 5, the phase "φi" of the current "I" of the primary coil 12 is zero or advanced phase near the resonance frequency "ft" and is "−π/2" when the phase "φi" is not near the resonance frequency "ft".

As illustrated in the curve line "CBA3" of FIG. 4, the current "Ir" of the secondary resonance coil 22 is maximum at 10 MHz where the frequency of the current "Ir" is equal to the frequency "fd" of the AC source 11.

As illustrated in the curve line "CBB3" of FIG. 5, the phase "φir" of the current "Ir" of the secondary resonance coil 22 is "−π3/2" at 10 MHz which is the resonance frequency "ft", which is equal to the target value "φmr". Further, when the frequency "fd" is lower than the resonance frequency "ft", the phase difference "Δφ" decreases and approaches "−π/2", and when the frequency "fd" is higher than the resonance frequency "ft", the phase difference "Δφ" increases and approaches "−5π/2", that is, "−π/2".

As described above, the phases "φit" and "φir" of the currents "It" and "Ir" which flows through the primary resonance coil 13 and the secondary resonance coil 22 greatly change near the resonance frequencies "ft" and "fr", respectively. By controlling the phases "φit" and "φir", that is, the phase differences "Δφt" and "Δφr" to be equal to "−π/2" or "−3π/2", it becomes possible that the resonance frequencies "ft" and "fr" of the primary resonance coil 13 and the secondary resonance coil 22, respectively, are equal to the frequency "fd" of the voltage "Vt" with high accuracy.

By doing this, even when, for example, some environmental factor changes, it becomes possible that the resonance frequencies of the power transmission system coil "TC" and the power receiving system coil "RC" are equal to the frequency "fd" of the AC source 11, and it becomes possible to transmit power from a power transmission apparatus 3 to a power receiving apparatus 4 always with the maximum efficiency.

Further, since the control is performed based on the phase difference "Δφ" of the coil current relative to the voltage "Vt" of the AC source 11, it become possible to perform accurate control without being influenced by the fluctuation of the amplitude of the current which may be observed, for example, in a sweep search method.

In the sweep search method, for example, a value of L or C in the power transmission system coil "TC" or the power receiving system coil "RC" is changed (swept), so that the point (position) is searched where the current value of the coil becomes maximum (peak) through a trial and error process.

Figures 6, 7:
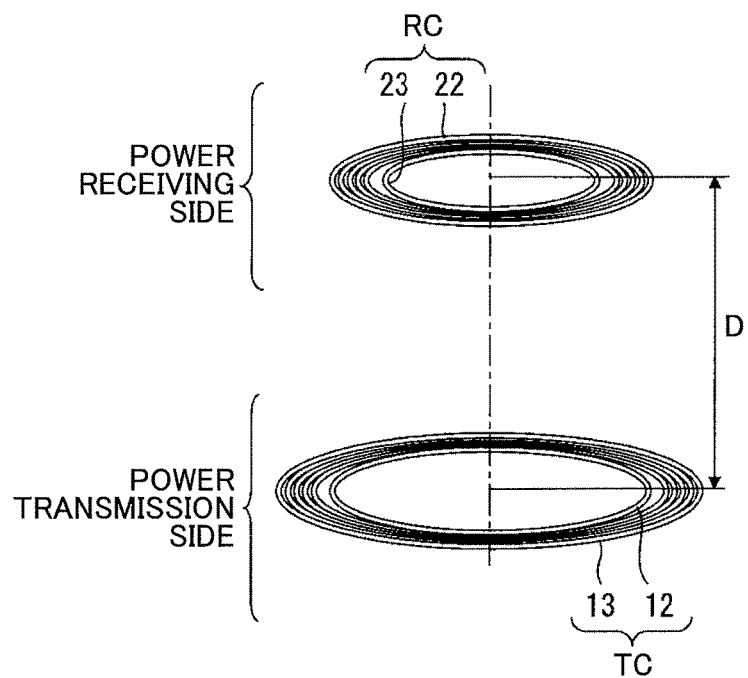
FIG. 6 illustrates simulation conditions in the power transmission apparatus 100 of FIGS. 2 and 3.
FIG. 7 illustrates the simulation conditions in the power transmission apparatus 100 of FIGS. 2 and 3.

FIGS. 6 and 7 illustrate an example simulation condition in the power transmission apparatus 100 of FIGS. 2 and 3. As illustrated in FIG. 6, as the simulation condition, the primary coil 12 and the primary resonance coil 13 are disposed on the same plane and in a concentric manner, and the secondary resonance coil 22 and the secondary coil 23 are also disposed on the same plane and in a concentric manner.

Further, a distance "D" between the power transmission system coil "TC" (the primary coil 12 and the primary resonance coil 13) and the power receiving system coil "RC" (the secondary resonance coil 22 and the secondary coil 23) is set to 25 mm. Further, a drive frequency (i.e., the frequency "fd" of the AC source 11) is set to 7 MHz. Further, a load (i.e., the resistance of the load device 21) is set to 10Ω. Further, the diameter of the winding of the coils is set to 0.5 mm.

Further, as illustrated in FIG. 7, the outer diameter of the primary coil 12 is set to φ20 mm, and the number of turns is set to one. Further, the outer diameter of the primary resonance coil 13 is set to φ40 mm, and the number of turns is set to five. Further, the outer diameter of the secondary resonance coil 22 is set to φ30 mm, and the number of turns is set to five. Further, the outer diameter of the secondary coil 23 is set to φ20 mm, and the number of turns is set to one. Further, a pitch between the centers of the windings next to each other in each of the primary resonance coil 13 and the secondary resonance coil 22 is set to 0.8 mm.

Next, with reference to FIGS. 8A through 9C, the frequency characteristics of the current and the phase of the primary resonance coil 13 and the secondary resonance coil 22 are described when the coupling degree between the primary resonance coil 13 to the secondary resonance coil 22 is changed by changing the distance "D" (see FIG. 6) between the primary resonance coil 13 to the secondary resonance coil 22.

Figure 8A:
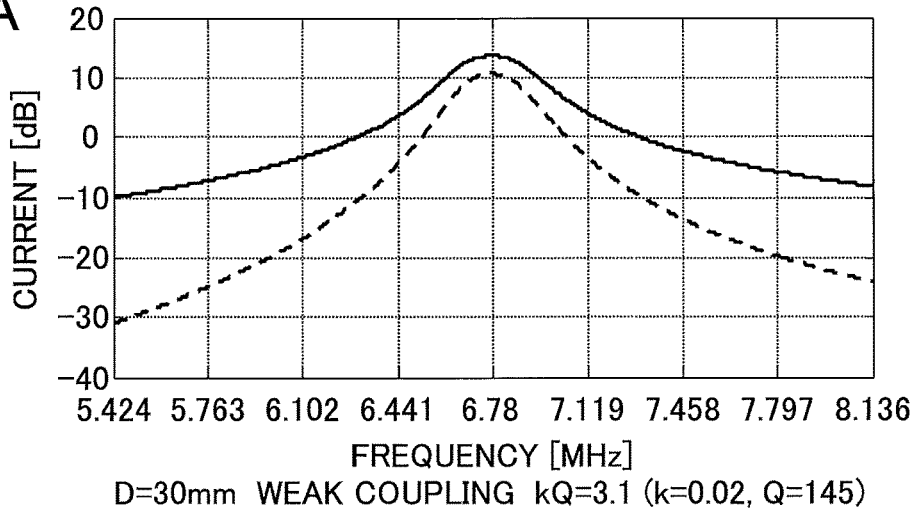
FIGS. 8A through 8C illustrate frequency characteristics of current values of current flowing through a primary resonance coil 13 and current flowing through a secondary resonance coil 22 depending on a distance "D"
Figure 8B:
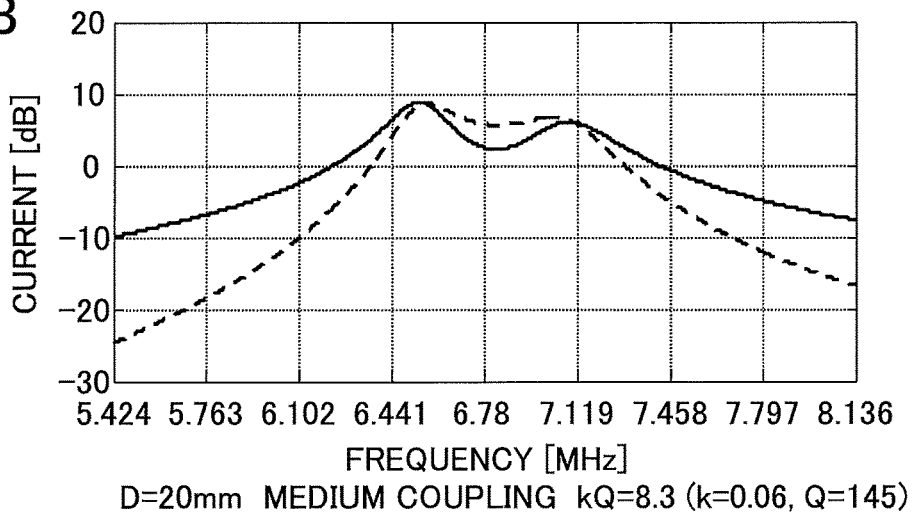
Figure 8C:
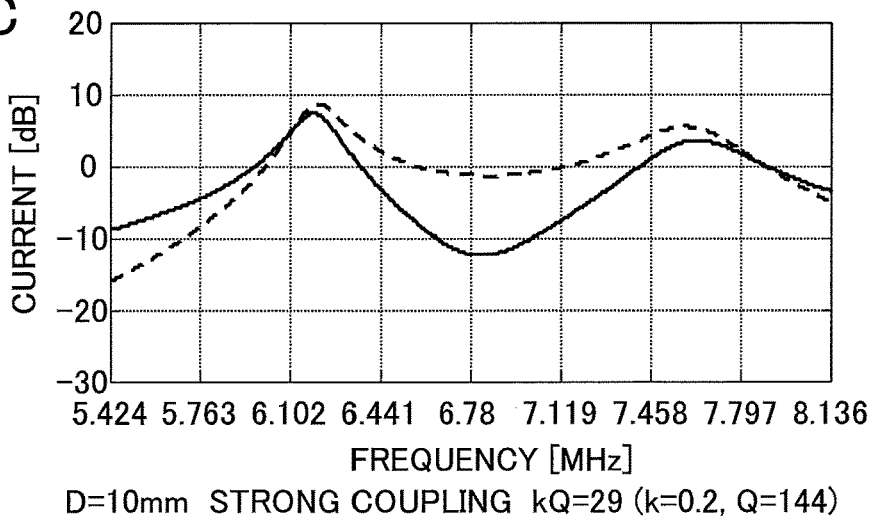
Figure 9A:
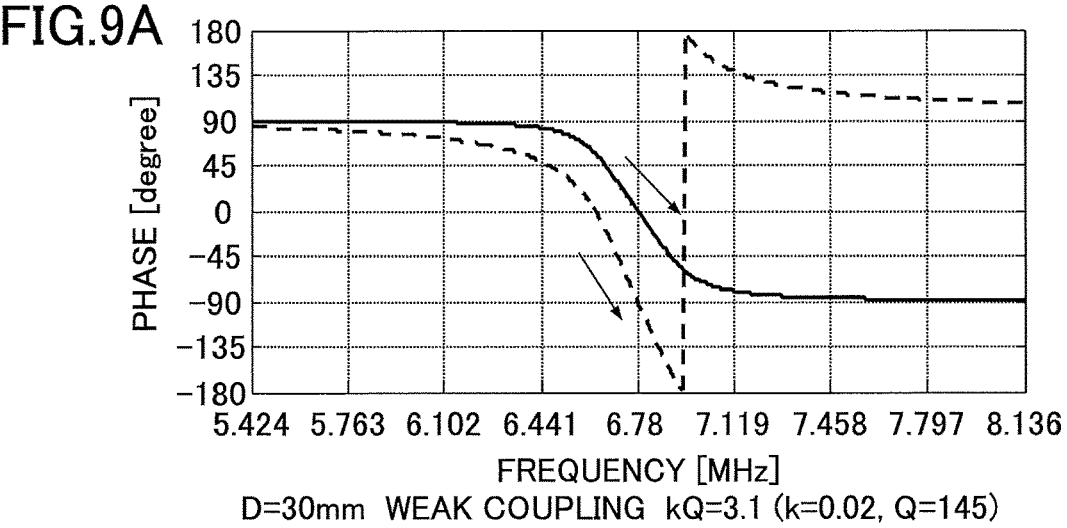
FIG. 9A through 9C illustrate frequency characteristics of phases of the current flowing through the primary resonance coil 13 and the current flowing through the secondary resonance coil 22 depending on the distance "D"
Figure 9B:
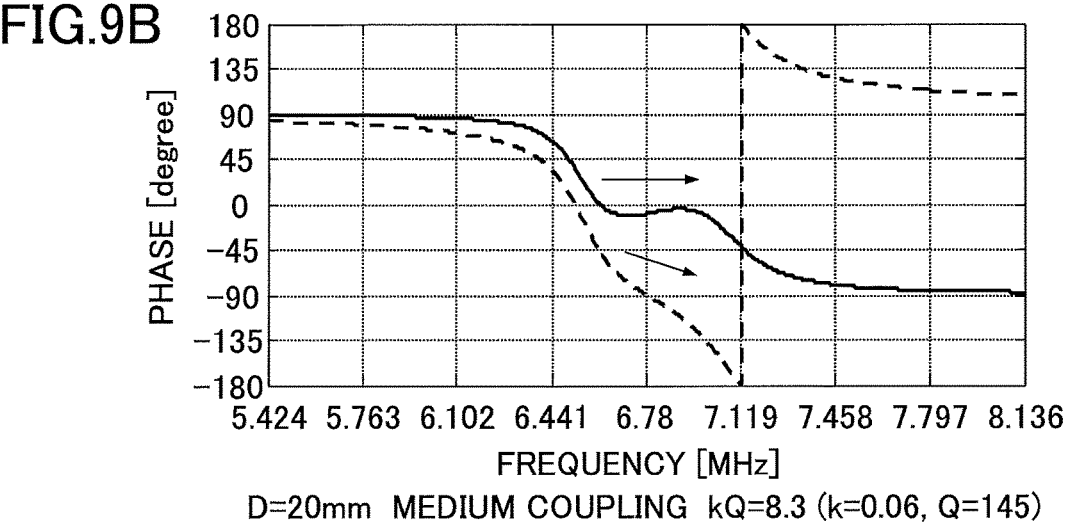
Figure 9C:
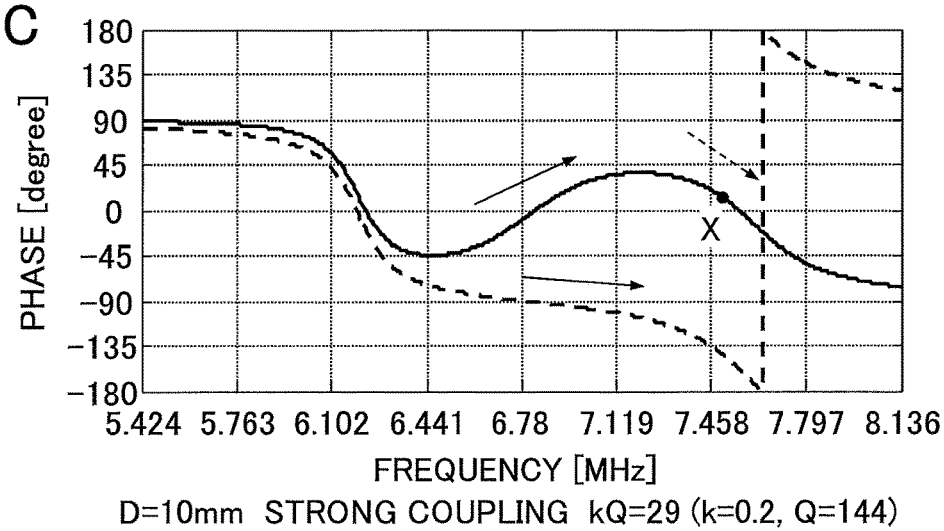

Specifically, FIGS. 8A through 8C illustrates the frequency characteristics of the currents which flow through the primary resonance coil 13 to the secondary resonance coil 22 when the distance "D" is changed. On the other hand, FIGS. 9A through 9C illustrates the frequency characteristics of the phases of the currents which flow through the primary resonance coil 13 to the secondary resonance coil 22 when the distance "D" is changed.

Those six frequency characteristics of FIGS. 8A through 9C are obtained by not only changing the distance "D" but also changing the frequency of the AC voltage output from the AC source 11 in the simulations.

FIGS. 8A, 8B, and 8C illustrate the frequency characteristics of the currents flowing through the primary resonance coil 13 to the secondary resonance coil 22 when the distance "D" is set to 30 mm, 20 mm, and 10 mm, respectively.

In FIGS. 8A through 8C, the horizontal axis denotes the frequency of the AC voltage output from the AC source 11, and the vertical axis denotes the current values of the currents which flow through the primary resonance coil 13 and the secondary resonance coil 22. The solid line indicates the current value of the current which flows through the primary resonance coil 13, and the dotted line indicates the current value of the current which flows through the secondary resonance coil 22.

FIGS. 9A, 9B, and 9C illustrate the frequency characteristics of the phases of the currents which flow through the primary resonance coil 13 and the secondary resonance coil 22 when the distance "D" is set to 30 mm, 20 mm, and 10 mm, respectively.

In FIGS. 9A through 9C, the horizontal axis denotes the frequency of the AC power output from the AC source 11. Note that the frequency of the AC power output from the AC source 11 described in the vertical axis is equal to the frequency of power applied to the primary resonance coil 13.

Further, in FIGS. 9A through 9C, the vertical axis denotes the phase of the currents which flow through the primary resonance coil 13 and the secondary resonance coil 22. The solid line indicates the phase of the current which flows through the primary resonance coil 13, and the dotted line indicates the phase of the current which flows through the secondary resonance coil 22.

Here, note that the phases of the currents which flow through the primary resonance coil 13 and the secondary resonance coil 22 are expressed as the respective phase differences where the phase of the AC voltage output from the AC source 11 is regarded as the reference (phase). That is, FIGS. 9A through 9C illustrate the phases of the currents which flow through the primary resonance coil 13 and the secondary resonance coil 22 in a case where the phase of the AC voltage output from the AC source 11 is (set to) 0 degrees.

FIGS. 9A through 9C illustrate whether the phases of the currents which flow through the primary resonance coil 13 and the secondary resonance coil 22 are delayed or advanced relative to the phase of the AC voltage output from the AC source 11.

In FIGS. 9A through 9C, when the phase is a negative value, which indicates that the phase of the current is delayed relative to the phase of the AC voltage output from the AC source 11. On the other hand, when the phase is a positive value, which indicates that the phase of the current is advanced relative to the phase of the AC voltage output from the AC source 11.

In a case where the distance "D" is 30 mm in FIGS. 8A and 9A, a coupling coefficient "k" is 0.02, a Q value is 145 (Q=145), a kQ product is approximately 3.1. Further, in a case where the distance "D" is 20 mm in FIGS. 8B and 9B, the coupling coefficient "k" is 0.06, the Q value is 145 (Q=145), the kQ product is approximately 8.3. Further, in a case where the distance "D" is 10 mm in FIGS. 8C and 9C, the coupling coefficient "k" is 0.2, the Q value is 144 (Q=144), the kQ product is approximately 29.

The greater the kQ product is, the higher the transmission efficiency of power from the primary resonance coil 13 to the secondary resonance coil 22. In this regard, for the sake of convenience, the coupling in a case where the distance is 30 mm is called a "weak coupling"; the coupling in a case where the distance is 20 mm is called a "medium coupling"; and the coupling in a case where the distance is 10 mm is called a "strong coupling".

The "weak coupling", the "medium coupling", and the "strong coupling" are relative concepts indicating the coupling degree between the primary resonance coil 13 and the secondary resonance coil 22. Typically, whether the coupling degree between the primary resonance coil 13 and the secondary resonance coil 22 is any of the "weak coupling", the "medium coupling", and the "strong coupling" is determined based on not only the distance "D" but also other factors such as the outer diameters and the number of turns of and the pitch between the primary resonance coil 13 and the secondary resonance coil 22. That is, it is difficult to determine based only on the range of the distance "D".

A method of determining whether the coupling degree is "weak coupling", the "medium coupling", or the "strong coupling" in the power transmission apparatus 100 according to the first embodiment is described below.

As illustrated in FIG. 8A, in a case of the "weak coupling" (D=30 mm), each of the frequency characteristics of the currents flowing through the primary resonance coil 13 and the secondary resonance coil 22 indicates a "single-peak type". The maximum value of the currents is obtained when the frequency is 6.78 MHz, which is equal to the resonant frequency (6.78 MHz) of the primary resonance coil 13 and the secondary resonance coil 22.

On the other hand, as illustrated in FIG. 8B, in a case of the "medium coupling" (D=20 mm), each of the frequency characteristics of the currents flowing through the primary resonance coil 13 and the secondary resonance coil 22 indicates a "double-peak type". The maximum values (local maximum values) of the currents are obtained when the frequency are approximately 6.5 MHz, which is lower than the resonant frequency (6.78 MHz) of the primary resonance coil 13 and the secondary resonance coil 22 and approximately 7.1 MHz, which is higher than the resonant frequency (6.78 MHz).

Further, as illustrated in FIG. 8C, in a case of the "strong coupling" (D=10 mm), each of the frequency characteristics of the currents flowing through the primary resonance coil 13 and the secondary resonance coil 22 indicates the "double-peak type". The maximum values (local maximum values) of the currents are obtained when the frequency are approximately 6.2 MHz, which is lower than the resonant frequency (6.78 MHz) of the primary resonance coil 13 and the secondary resonance coil 22 and approximately 7.6 MHz, which is higher than the resonant frequency (6.78 MHz).

As described above, the frequency characteristics of the currents flowing through the primary resonance coil 13 and the secondary resonance coil 22 indicate the "single-peak type" and the "double-peak type" when the coupling degree is relatively low and high, respectively. Further, there is a tendency that the higher the coupling degree becomes, the greater the distance between two peaks in the "double-peak type" becomes.

Further, as illustrated by the solid line of FIG. 9A, in the case of the "weak coupling" (D=30 mm), there is a tendency that the phase of the current flowing through the primary resonance coil 13 delays near the resonance frequency (6.78 MHz) of the primary resonance coil 13 and the secondary resonance coil 22 as the frequency of the AC voltage output from the AC source 11 increases (downward-sloping tendency).

Further, as illustrated by the dotted line of FIG. 9A, in the case of the "weak coupling" (D=30 mm), there is a tendency that the phase of the current flowing through the secondary resonance coil 22 delays near the resonance frequency (6.78 MHz) of the primary resonance coil 13 and the secondary resonance coil 22 as the frequency of the AC voltage output from the AC source 11 increases (downward-sloping characteristics).

Further, as illustrated by the solid line of FIG. 9B, in the case of the "medium coupling" (D=20 mm), there is a tendency that the phase of the current flowing through the primary resonance coil 13 does not (greatly) change near the resonance frequency (6.78 MHz) of the primary resonance coil 13 and the secondary resonance coil 22 as the frequency of the AC voltage output from the AC source 11 increases (flat characteristics).

Further, as illustrated by the dotted line of FIG. 9B, in the case of the "medium coupling" (D=20 mm), there is a tendency that the phase of the current flowing through the secondary resonance coil 22 decreases near the resonance frequency (6.78 MHz) of the primary resonance coil 13 and the secondary resonance coil 22 as the frequency of the AC voltage output from the AC source 11 increases (downward-sloping characteristics).

Further, as illustrated by the solid line of FIG. 9C, in the case of the "strong coupling" (D=10 mm), there is a tendency that the phase of the current flowing through the primary resonance coil 13 advances near the resonance frequency (6.78 MHz) of the primary resonance coil 13 and the secondary resonance coil 22 as the frequency of the AC voltage output from the AC source 11 increases (upward-sloping characteristics).

Further, as illustrated by the dotted line of FIG. 9C, in the case of the "strong coupling" (D=10 mm), there is a tendency that the phase of the current flowing through the secondary resonance coil 22 gently delays near the resonance frequency (6.78 MHz) of the primary resonance coil 13 and the secondary resonance coil 22 as the frequency of the AC voltage output from the AC source 11 increases (gentle downward-sloping characteristics).

Here, an attention is paid to the phases of the current flowing through the primary resonance coil 13 as illustrated by the solid lines of FIGS. 9A through 9C.

The phase of the current flowing through the primary resonance coil 13 in the case of the "weak coupling" (D=30 mm) as illustrated by the solid line of FIG. 9A has a tendency to be delayed around the resonance frequency (6.78 MHz) of the primary resonance coil 13 and the secondary resonance coil 22 as the frequency of the AC voltage output from the AC source 11 increases (downward-sloping characteristics).

Further, the phase of the current flowing through the primary resonance coil 13 in the case of the "medium coupling" (D=20 mm) as illustrated by the solid line of FIG. 9B has a tendency to be unchanged around the resonance frequency (6.78 MHz) of the primary resonance coil 13 and the secondary resonance coil 22 as the frequency of the AC voltage output from the AC source 11 increases (flat characteristics).

Further, the phase of the current flowing through the primary resonance coil 13 in the case of the "strong coupling" (D=10 mm) as illustrated by the solid line of FIG. 9C has a tendency to advance around the resonance frequency (6.78 MHz) of the primary resonance coil 13 and the secondary resonance coil 22 as the frequency of the AC voltage output from the AC source 11 increases (upward-sloping characteristics).

That is, the phase of the current which flows through the primary resonance coil 13 tends to be delayed (downward-sloping characteristics), unchanged (flat characteristics), and advanced (upward-sloping characteristics) around the resonance frequency (6.78 MHz) of the primary resonance coil 13 and the secondary resonance coil 22 as the frequency of the AC voltage output from the AC source 11 increases.

Further, when the capacitance of the capacitor 132 is increased, the resonance frequency of the primary resonance coil 13 and the secondary resonance coil 22 is lowered. In contrast, when the capacitance of the capacitor 132 is decreased, the resonance frequency of the primary resonance coil 13 and the secondary resonance coil 22 is increased. This is obvious from above Formula (1).

When the resonance frequency is lowered, the frequency characteristics of the currents of FIGS. 8A, 8B, and 8C are shifted to the left side. Due to this, when resonance frequency is lowered, the frequency characteristics of the phases of FIGS. 9A, 9B, and 9C are also shifted to the left side as well. In this case, the frequency characteristics of the phases of FIGS. 9A, 9B, and 9C are shifted in a manner such that the point where the phase is 0 degrees (resonance point) corresponds to the resonance frequency in the frequency characteristics of the currents in FIGS. 8A, 8B, and 8C.

Here, in a case where power is actually transmitted from the power transmission side to the power receiving side in the power transmission apparatus 100, the frequency of the AC voltage output from the AC source 11 is set to a frequency allocated to the power transmission apparatus 100. In the first embodiment, the frequency allocated to the power transmission apparatus 100 is 6.78 MHz.

Due to this, in a case where the resonance frequency of the primary resonance coil 13 and the secondary resonance coil 22 is lowered by continuously increasing (sweeping) the capacitance of the capacitor 132, if there exists a change in the phase of the current which flows through the primary resonance coil 13, the output of the phase comparison section 151 (see FIG. 3) changes. The phase comparison section 151 outputs a signal indicating the phase difference "$\Delta\varphi t$" between the phase "$\varphi vt$" of the AC voltage at 6.78 MHz output from the AC source 11 and the phase "$\varphi it$" of the current which flows through the primary resonance coil 13.

Here, in the case of the "weak coupling", when the resonance frequency of the primary resonance coil 13 and the secondary resonance coil 22 is lowered by continuously sweeping the capacitance of the capacitor 132, the downward-sloping characteristics of FIG. 9A is shifted to the left side, so that the phase "$\varphi it$" of the current relative to the phase "$\varphi vt$" of the AC voltage at 6.78 MHz is delayed. In this case, the signal indicating the phase difference "$\Delta\varphi t$" output from the phase comparison section 151 represents the phase delay.

Further, in the case of the "medium coupling", even when the flat characteristics of FIG. 9B is shifted to the left side by continuously sweeping the capacitance of the capacitor 132 to lower the resonance frequency of the primary resonance coil 13 and the secondary resonance coil 22, the phase "$\varphi it$" of the current relative to the phase "$\varphi vt$" of the AC voltage at 6.78 MHz hardly changes. In this case, the signal indicating the phase difference "$\Delta\varphi t$" output from the phase comparison section 151 represents little change.

Further, in the case of the "strong coupling", when the resonance frequency of the primary resonance coil 13 and the secondary resonance coil 22 is lowered by continuously sweeping the capacitance of the capacitor 132, the upward-sloping characteristics of FIG. 9C is shifted to the left side, so that the phase "$\varphi it$" of the current relative to the phase "$\varphi vt$" of the AC voltage at 6.78 MHz is advanced. In this case, the signal indicating the phase difference "$\Delta\varphi t$" output from the phase comparison section 151 represents the phase advance.

As described above, it becomes possible for the power transmission side alone to detect the change of the signal which indicates the phase difference "$\Delta\varphi t$" output from the phase comparison section 151 when the capacitance of the capacitor 132 is increased (changed).

That is, it becomes possible to determine (detect) the coupling degree between the primary resonance coil 13 and the secondary resonance coil 22 based on the output from the phase comparison section 151 when the resonance frequency of the primary resonance coil 13 is lowered by sweeping the capacitance of the capacitor 132 while the power receiving side is not operated and the feedback control of the power transmission side is set off by setting off the compensation section 155 (FIG. 3). The phrase "the power receiving side is not operated" does not refers to a state where power is (typically) transmitted from the power transmission side to the power receiving side, but refers to a state where only limited AC power is output by the AC source 11 to just determine the coupling degree on the power transmission side.

In this case, by detecting the output of the phase comparison section 151 by the determination control section 160 (see FIG. 3), it becomes possible for the determination control section 160 to determine the coupling degree between the primary resonance coil 13 and the secondary resonance coil 22.

As described above, since it is possible for the phase comparison section 151 to monitor the phase difference "Δφt" between the phase "φvt" of the AC voltage and the phase "φvi" of the current flowing through the primary resonance coil 13, attention is paid on the phase of the current flowing through the primary resonance coil 13 in the power transmission apparatus 100 according to the first embodiment.

Here, according to the first embodiment, whether the coupling degree between the primary resonance coil 13 and the secondary resonance coil 22 corresponds to the "weak coupling", the "medium coupling", or the "strong coupling" is determined as described below.

In the first embodiment, whether the coupling degree corresponds to the "weak coupling", the "medium coupling", or the "strong coupling" is determined based on the signal representing the phase difference "Δφt" output from the phase comparison section 151 by continuously changing (sweeping) the capacitance of the capacitor 132 so as to increase the capacitance to lower the resonance frequency of the primary resonance coil 13 and the secondary resonance coil 22.

When the phase difference "Δφt" is less than or equal to a first predetermined value which indicates the phase delay, it is determined that the coupling degree corresponds to the "weak coupling". The first predetermined value is a negative value. The specific value of the first predetermined value may be determined based on, for example, the distance "D", and the outer diameters and the number of turns of and the pitch between the primary resonance coil 13 and the secondary resonance coil 22 after simulations and experiments.

Further, when the phase difference "Δφt" is greater than the first predetermined value and less than a second predetermined value which indicates the phase advance, it is determined that the coupling degree corresponds to the "medium coupling". The second predetermined value is a positive value. The specific value of the second predetermined value may be determined based on, for example, the distance "D", and the outer diameters and the number of turns of and the pitch between the primary resonance coil 13 and the secondary resonance coil 22 after simulations and experiments.

Further, when the phase difference "Δφt" is greater than or equal to the second predetermined value, it is determined that the coupling degree corresponds to the "strong coupling".

Further, as described above, the distance by which power can be transmitted in power transmission by magnetic field resonance is longer than that in power transmission by electromagnetic induction. Therefore, in power transmission by magnetic field resonance, it is possible to transmit power even when the power transmission side and the power receiving side are more separated from each other.

Due to this, when power is transmitted by magnetic field resonance, there may be a case where the power transmission side and the power receiving side are separated from each other to some extent.

Due to this, in the power transmission apparatus 100 according to the first embodiment, the settings such as the gain in the feedback control by the feedback control sections 144 and 244 are determined to correspond to the case of the "weak coupling". That is, it is assumed that phase of the current is delayed in response to the increase of the capacitance of the capacitor 132.

Further, herein, a case is described where the coupling degree between the primary resonance coil 13 and the secondary resonance coil 22 is determined based on the output from the phase comparison section 151 when the capacitance of the capacitor 132 is continuously changed (swept) to increase the capacitance to lower the resonance frequency of the primary resonance coil 13 and the secondary resonance coil 22.

Note that, however, the coupling degree between the primary resonance coil 13 and the secondary resonance coil 22 may be determined based on the output from the phase comparison section 151 when the capacitance of the capacitor 132 is continuously changed (swept) to decrease the capacitance.

When the capacitance of the capacitor 132 is decreased, the resonance frequency of the primary resonance coil 13 and the secondary resonance coil 22 is increased. Accordingly, when the phase is shifted in the direction opposite to the direction in which the phase is shifted when the capacitance of the capacitor 132 is increased, the coupling degree between the primary resonance coil 13 and the secondary resonance coil 22 may be determined in the same manner.

Figure 10:
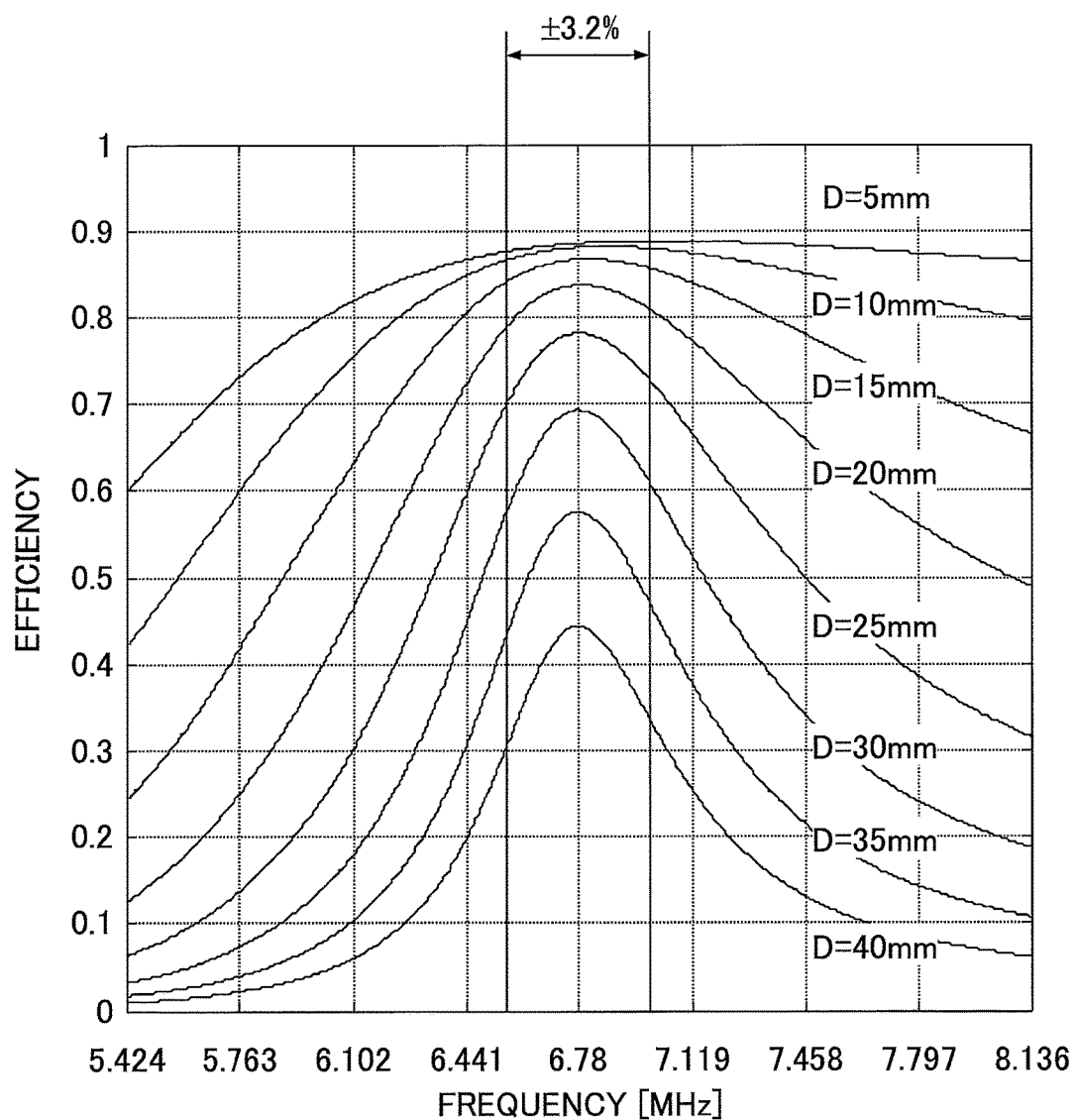
FIG. 10 illustrates example relationships between the distance "D" and a transmission efficiency of power transmitted from a power transmission side to a power receiving side.

Next, a relationship between the distance "D" and the transmission efficiency of power transmitted from the power transmission side to the power receiving side with reference to FIG. 10.

FIG. 10 illustrates the relationship between the distance "D" and the transmission efficiency of power transmitted from the power transmission side to the power receiving side. The transmission efficiency indicated in the vertical axis refers to a ratio of power output from the secondary coil 23 to power input into the primary coil 12. Power is transmitted from the primary coil 12 to the secondary coil 23 via the primary resonance coil 13 and the secondary resonance coil 22.

The horizontal axis of FIG. 10 denotes the frequency of the AC voltage output from the AC source 11. The characteristics of the transmission efficiency in the horizontal axis is obtained by simulation. The frequency of the AC voltage output from the AC source 11 indicated in the horizontal axis is equal to the frequency of power which is applied to the primary resonance coil 13.

As illustrated in FIG. 10, in any of the distances "D", the transmission efficiency becomes the maximum when the frequency is equal to the resonance frequency of the primary resonance coil 13 and the secondary resonance coil 22 (i.e., 6.78 MHz). Further, in any of the distances "D", as the frequency shifts from the frequency 6.78 MHz, the transmission efficiency is tend to be reduced.

Further, there is a tendency that the smaller the distance "D" is, the higher the transmission efficiency is and the smaller the change of the transmission efficiency relative to the change of the frequency becomes. In other words, there is a tendency that the greater the distance "D" is, the lower the transmission efficiency is and the greater the change of the transmission efficiency relative to the change of the frequency becomes.

For example, in a case where the adjustable range of the capacitance of the capacitor 132 is ±10% with the center frequency (0%) of 6.78 MHz, the adjustable range of the resonance frequency of the primary resonance coil 13 and the secondary resonance coil 22 is approximately ±3.2%. This adjustable range of the capacitance of the capacitor 132 corresponds to the range indicated by both arrows with the center frequency of 6.78 MHz in the horizontal direction of FIG. 10.

Even within such an adjustable range (approximately ±3.2%) of the resonance frequency, as illustrated in FIG. 10, there is a tendency that the smaller the distance "D" is, the higher the transmission efficiency is and the smaller the change of the transmission efficiency relative to the change of the frequency becomes, that is, the greater the distance "D" is, the lower the transmission efficiency is and the greater the change of the transmission efficiency relative to the change of the frequency becomes.

On the other hand, in a case where power is transmitted from the power transmission side to the power receiving side of the power transmission apparatus 100, if the feedback control is performed by the feedback control sections 144 and 244 (see FIGS. 2 and 3) regardless of the coupling degree between the primary resonance coil 13 and the secondary resonance coil 22, the following phenomena are observed.

In the case of the "weak coupling" of FIG. 9A, when the capacitance of the capacitor 132 is changed (swept) to lower the resonance frequency of the primary resonance coil 13 and the secondary resonance coil 22, the downward-sloping characteristics of FIG. 9A is shifted to the left side, so that the phase "φit" of the current relative to the phase "φvt" of the AC voltage at 6.78 MHz is delayed.

In a case where the phase of the current changes in this way, if the feedback control is performed by the feedback control sections 144 and 244 (see FIGS. 2 and 3), since the change of the phase of the current relative to the change of the capacitance of the capacitor 132 is in the same polarity, the gain adjustment, etc., by the feedback control sections 144 and 244 is done successfully.

This is because reference settings of the gain, etc., in the e feedback control is performed by the feedback control sections 144 and 244 are based on the "weak coupling", that is, it is assumed that the phase of the current delays relative to the increase of the capacitance of the capacitors 132 and 222.

In the case of the "medium coupling" of FIG. 9B, even when the capacitance of the capacitor 132 is changed (swept) to lower the resonance frequency of the primary resonance coil 13 and the secondary resonance coil 22 and shift the flat characteristics of FIG. 9B to the left side, the phase "φit" of the current relative to the phase "φvt" of the AC voltage at 6.78 MHz is almost unchanged.

In a case where the phase of the current is almost unchanged as described above, if the feedback control is performed by the feedback control sections 144 and 244 (see FIGS. 2 and 3), since the phase "φit" of the current is almost unchanged even by changing the capacitance of the capacitor 132, so that the gain adjustment by the feedback control section 144 cannot be successfully performed (aligned).

Therefore, in the case of the "medium coupling", the feedback control by the feedback control section 144 cannot be performed normally. As a result, the feedback control by the feedback control section 244 may not be performed normally as well.

In the case of the "strong coupling" of FIG. 9C, when the capacitance of the capacitor 132 is changed (swept) to lower the resonance frequency of the primary resonance coil 13 and the secondary resonance coil 22, the upward-sloping characteristics of FIG. 9C is shifted to the left side, so that the phase "φit" of the current relative to the phase "φvt" of the AC voltage at 6.78 MHz is advanced.

In a case where the phase "φit" of the current advances near the resonance point, if the feedback control is performed by the feedback control sections 144 and 244 (see FIGS. 2 and 3), since the change of the phase of the current relative to the change of the capacitance of the capacitor 132 is in the polarity which is opposite to the polarity in the change of the phase in the case of the "weak coupling", the gain adjustment by the feedback control section 144 cannot be aligned successfully.

When the polarity of the gain adjustment by the feedback control section 144 is opposite to the polarity of the change of the phase of the current relative to the change of the capacitance of the capacitor 132, the resonance frequency of the current flowing through the primary resonance coil 13 cannot be determined (fixed), so that the control may be spread.

Further, there is a possibility that the resonance frequency of the current flowing through the primary resonance coil 13 becomes stable at such a point "X" in FIG. 9C. The point "X", however, is not always an appropriate operating point, and may not be an intended operating point.

Therefore, in the case of the "strong coupling", the feedback control by the feedback control section 144 cannot function normally. As a result, the feedback control by the feedback control section 244 may not function normally as well.

On the other hand, as illustrated in FIG. 10, in a case where the distance "D" is relatively small, the transmission efficiency is higher and the fluctuation relative to the change of the frequency is smaller than those in the case where the distance "D" is relatively great.

Therefore, in the power transmission apparatus 100 according to the first embodiment, the feedback control by the feedback control sections 144 and 244 is performed only when the determination result of the coupling degree between the primary resonance coil 13 and the secondary resonance coil 22 is the "weak coupling".

Further, in the power transmission apparatus 100 according to the first embodiment, when the determination result of the coupling degree between the primary resonance coil 13 and the secondary resonance coil 22 is the "medium coupling" or the "strong coupling" (i.e., other than the "weak coupling"), the feedback control by the feedback control sections 144 and 244 is not performed.

This is because of the following reason. In the feedback control section 144, the settings of the gain, etc., are done based on the case of the "weak coupling" as the reference. Further, in a case where the distance "D" is relatively great as in the case of the "weak coupling", as illustrated in FIG. 10, the transmission efficiency is relatively low and the fluctuation relative to the change of the frequency is relatively great.

Due to this, in the case of the "weak coupling", it is more beneficial to operate at the most appropriate operating point obtained by the feedback control.

On the other hand, in the case of the "medium coupling" and the "strong coupling", the feedback control by the feedback control section 144 on the power transmission side may not be normally functioning. Further, as illustrated in FIG. 10, in the case of the "medium coupling" and the "strong coupling", the transmission efficiency is relatively high and the fluctuation of the transmission efficiency relative to the change of the frequency is relatively small.

Due to this, in the case of the "medium coupling" and the "strong coupling", it can be thought that it is possible to operate at a point which is appropriate to some extent without performing the feedback control.

Due to the reasons described above, in the power transmission apparatus 100 according to the first embodiment, the feedback control by the feedback control sections 144 and 244 is performed only in the case of the "weak coupling", and the feedback control by the feedback control sections 144 and 244 is not performed in the case of the "medium coupling" or the "strong coupling".

Therefore, in the power transmission apparatus 100 according to the first embodiment, it is desired to determine whether the coupling degree between the primary resonance coil 13 and the secondary resonance coil 22 corresponds to the "weak coupling" or other than the "weak coupling" (i.e., the "medium coupling" or the "strong coupling").

Figure 11:
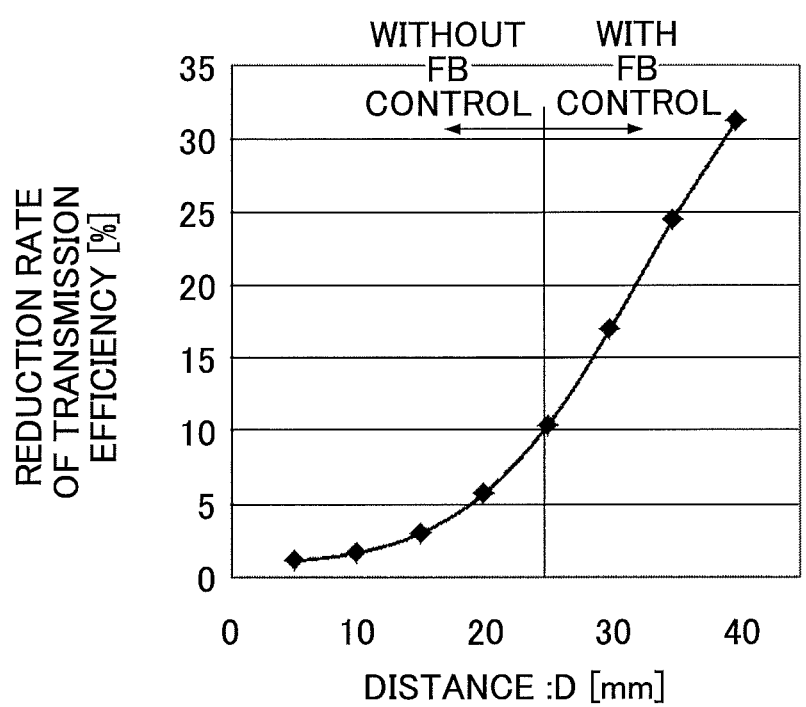
FIG. 11 is a graph illustrating an example characteristic of a reduction rate of the transmission efficiency relative to the distance "D" in the power transmission apparatus 100.

Here, with reference to FIG. 11, a decreasing rate of the transmission efficiency relative to the distance "D" is described (studied).

FIG. 11 illustrates characteristics of the decreasing rate of the transmission efficiency relative to the distance "D" in the power transmission apparatus 100 according to the first embodiment.

In FIG. 11, the horizontal axis denotes the distance "D" which is between the primary resonance coil 13 and the secondary resonance coil 22 (i.e., between "the primary coil 12 and the primary resonance coil 13" and "the secondary resonance coil 22 and the secondary coil 23"). Further, the vertical axis denotes the decreasing rate of the transmission efficiency. The decreasing rate of the transmission efficiency herein refers to a ratio of the maximum value of the lowered transmission efficiency when the frequency is changed by ±3.2% to the transmission efficiency at the resonance frequency (6.78 MHz) of FIGS. 9A through 9C.

As illustrated in FIG. 11, as the distance "D" increases, the decreasing rate of the transmission efficiency increases.

Here, in order to distinguish the "weak coupling" from the other than the "weak coupling" (i.e., the "medium coupling" or the "strong coupling"), it is assumed, for example, that the coupling degree is determined to be "weak coupling" when the transmission efficiency is lowered from the transmission efficiency at the frequency of 6.78 MHz by a third predetermined value in a case where the capacitance of the capacitor 132 is changed (swept) by a range of ±10%.

Further, herein, as an example, it is assumed that the third predetermined value (of the transmission efficiency) is 10%. In such a case, the case where the distance "D" is 25 mm becomes a boundary between the "weak coupling" and other than the "weak coupling".

In such a case, the coupling degree between the primary resonance coil 13 and the secondary resonance coil 22 is determined as the "weak coupling" when the distance "D" is 25 mm or more, so that the feedback control by the feedback control sections 144 and 244 is performed. The feedback control section 144 is an example of a controller.

Due to this, when the distance "D" is less than 25 mm, the coupling degree between the primary resonance coil 13 and the secondary resonance coil 22 is determined as the "medium coupling" or the "strong coupling", so that the feedback control by the feedback control sections 144 and 244 is not performed. This is to select the control mode in which the feedback control is not performed.

The power transmission apparatus 100 by itself cannot (directly) determine the distance "D". Therefore, the coupling degree between the primary resonance coil 13 and the secondary resonance coil 22 is determined as the "medium coupling" or the "strong coupling" based on a change rate "Δφt'" of the phase difference "Δφt" output from the phase comparison section 151 when the distance "D" is 25 mm. Here, it is assumed that the change rate "Δφt'" of the phase difference "Δφt" output from the phase comparison section 151 when the distance "D" is 25 mm is "a". The change rate "Δφt'" indicates a ratio of the change of the phase difference "Δφt" to the change of the capacitance of the capacitor 132.

In other words, the change rate "Δφt'" indicates a ratio of the change of the phase difference "Δφt" to the change of the resonance frequency of the primary resonance coil 13 and the secondary resonance coil 22. This is because the capacitance of the capacitor 132 corresponds to the resonance frequency of the primary resonance coil 13 and the secondary resonance coil 22. The phase difference change rate "α" is an example of a change rate of the phase difference indicating a first delay degree. The "weak coupling" is an example of a first coupling degree.

The power transmission apparatus 100 determines whether the coupling degree corresponds to the "weak coupling" or other than the "weak coupling" based on whether the change rate of the phase difference "Δφt" output from the phase comparison section 151 is less than or equal to "α" when the capacitance of the capacitor 132 is swept (changed) to be increased in a state where the power receiving side is set off and the compensation section 155 (see FIG. 3) is also set off.

When the capacitance of the capacitor 132 is swept (changed) to be increased, the phase "φit" of the current "It" flowing through the primary resonance coil 13 changes to be delayed relative to the phase "φvt" of the AC voltage output from the AC source 11, so that the change rate of the phase difference "Δφt" detected by the phase comparison section 151 becomes a negative value.

Due to this, when the distance "D" is 25 mm, the change rate "α" of the phase difference output from the phase comparison section 151 is a negative value.

Figure 12:
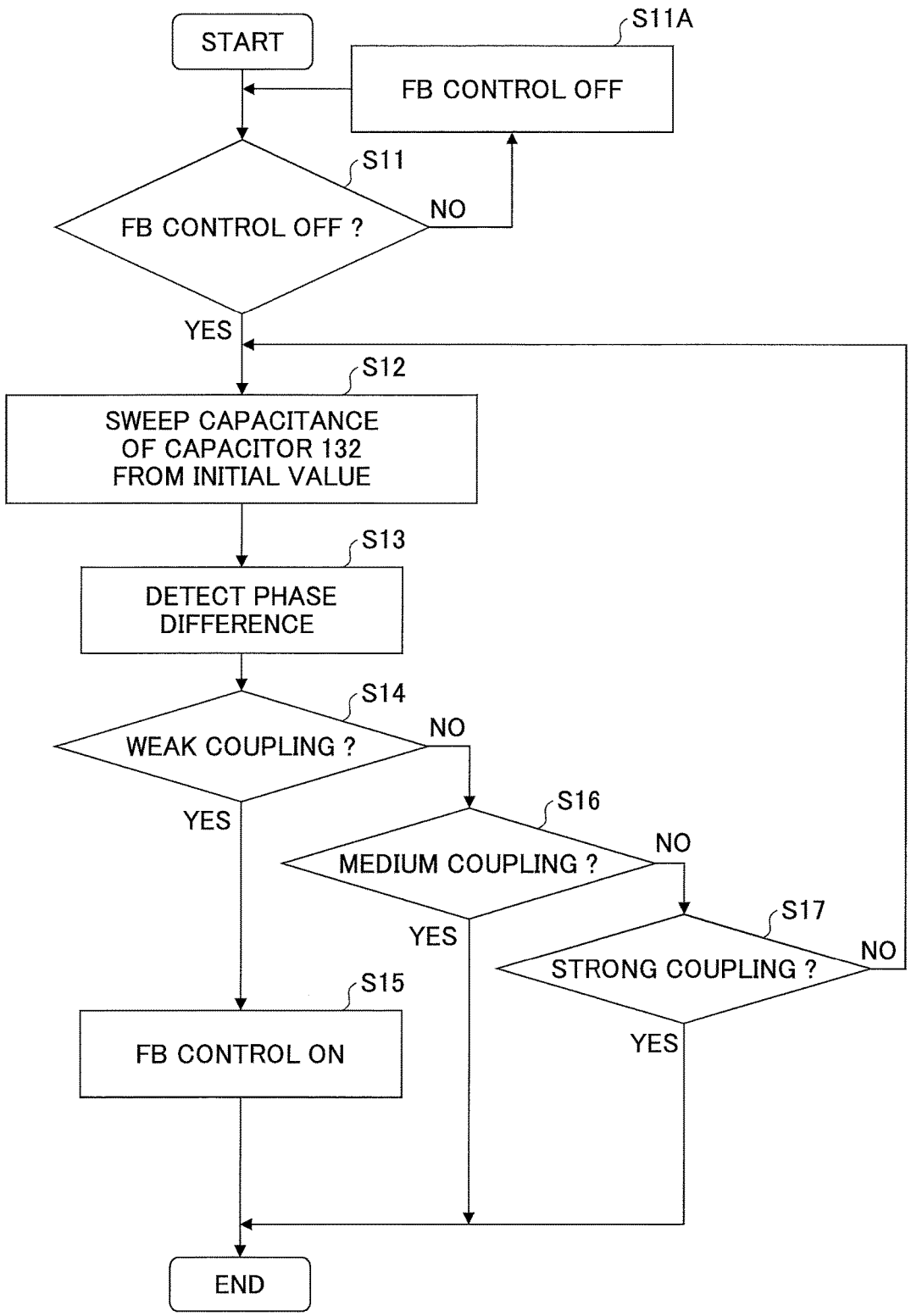
FIG. 12 is a flowchart of an example process executed by a determination control section 160 of the power transmission apparatus 100 according to the first embodiment.

Next, with reference to FIG. 12, the determination of the coupling degree and the switching on/off of the feedback control in the power transmission apparatus 100 are described.

FIG. 12 is a flowchart of an example process performed by the determination control section 160 of the power transmission apparatus 100 according to the first embodiment. When the power transmission apparatus 100 is turned on, the determination control section 160 starts the process of FIG. 12 (start).

The determination control section 160 determines whether the feedback control of the feedback control section 144 is set off (step S11). Here, the feedback (FB) control of the feedback control section 144 is set off when an off signal is input from the determination control section 160 to the on/off control terminal 155A of the compensation section 155.

When determining that the feedback control of the feedback control section 144 is not set off (NO in step S11), the determination control section 160 inputs the off signal to the compensation section 155 to set off the feedback control section 144 (step 11A).

When determining that the feedback control of the feedback control section 144 is set off (YES in step S11), the determination control section 160 causes the driver 156 to sweep (change) the capacitance of the capacitor 132 to increase the capacitance from an initial value (step S12).

For example, in a case where the adjustable range of the capacitance of the capacitor 132 is 10% with the center (0%) of 6.78 MHz, by the process in step S12, the capacitance of the capacitor 132 is swept (changed) from −10% to +10%.

Next, the determination control section 160 detects the phase difference "Δφt" input from the phase comparison section 151 (step S13).

Next, based on the change rate "Δφt'" of the phase difference "Δφt" detected in step S13, the determination control section 160 determines whether the coupling degree between the primary resonance coil 13 and the secondary resonance coil 22 corresponds to the "weak coupling" (step S14).

For example, in the case where the distance "D" is 25 mm, when the change rate "a" of the phase difference output from the phase comparison section 151 corresponds to the boundary value between the "weak coupling" and other than the "weak coupling", the determination control section 160 determines whether the coupling degree corresponds to the "weak coupling" by comparing the change rate "Δφt'" of the phase difference "Δφt" detected in step S13 with the change rate "α" of the phase difference.

In this case, when the change rate "Δφt'" of the phase difference "Δφt" detected in step S13 is less than or equal to the change rate "α" of the phase difference, the determination control section 160 determines that the coupling degree corresponds to the "weak coupling". On the other hand, when the change rate "Δφt'" of the phase difference "Δφt" detected in step S13 is greater than the change rate "α" of the phase difference, the determination control section 160 determines that the coupling degree corresponds to other than the "weak coupling".

When determining that the coupling degree corresponds to the "weak coupling" (YES in step S14), the determination control section 160 inputs the ON signal in the compensation section 155 to set on (turn on) the feedback control by the feedback control section 144 (step S15).

As a result, the feedback control is performed, and the series of the process terminates (end). The feedback control is performed as described above with reference to FIGS. 4 and 5.

On the other than, when determining that the coupling degree corresponds to other than the "weak coupling" (NO in step S14), the determination control section 160 further determines whether the coupling degree corresponds to the "medium coupling" (step S16). In step S16, it is determined whether the coupling degree corresponds to the "medium coupling" or the "strong coupling".

For example, in the characteristics of the decreasing rate of the transmission efficiency relative to the distance "D" of FIG. 11, the coupling degree between the primary resonance coil 13 and the secondary resonance coil 22 is determined as the "medium coupling" when the distance "D" is greater than or equal to 15 mm.

In this case, whether the coupling degree corresponds to the "medium coupling" or the "strong coupling" is determined based on whether the change rate "Δφt'" of the phase difference "Δφt" is less than or equal to "β" which is the change rate "Δφt'" of the phase difference "Δφt" output from the phase comparison section 151 when the distance "D" is 15 mm.

The determination control section 160 determines that the coupling degree corresponds to the "medium coupling" when the change rate "Δφt'" of the phase difference "Δφt" is less than or equal to "β" (YES in step S16). Then, the process terminates (end).

When determining that the change rate "Δφt'" of the phase difference "Δφt" is greater than "β" (NO in step S16), the determination control section 160 further determines whether the coupling degree corresponds to the "strong coupling" (step S17). The determination control section 160 determines that the coupling degree corresponds to the "strong coupling" when determining that the change rate "Δφt'" of the phase difference "Δφt" is less than "γ(>β)" (YES in step S17). Then, the process terminates (end).

On the other hand, in step S17, when the determination control section 160 determines that the coupling degree corresponds to the "strong coupling" when determining that the change rate "Δφt'" of the phase difference "Δφt" is not less than "γ", the process goes back to step S12. When the determination control section 160 determines NO in step S17, for example, the phase difference "Δφt" output from the phase comparison section 151 may have a problem.

By the above process, the determination control section 160 determines the coupling degree between the primary resonance coil 13 and the secondary resonance coil 22. Further, when determining that the coupling degree corresponds to the "weak coupling", the determination control section 160 turns (sets) on the feedback control of the feedback control section 144. As a result, under the state that the coupling degree between the primary resonance coil 13 and the secondary resonance coil 22 corresponds to the "weak coupling", both the feedback control on the power transmission side and the feedback control on the power receiving side are performed, so that it becomes possible to transmit power based on the most appropriate operating point.

On the other hand, in the case of the "medium coupling" or the "strong coupling", power is transmitted from the power transmission side to the power receiving side under the state where the feedback control of the feedback control section 144 is turned (set) off. In this case, the capacitance of the capacitor 132 can be set to the median (middle) value where the variable value is 0% or a predetermined value set in advance.

As described above, according to the first embodiment, it becomes possible to provide the power transmission apparatus 100 which can efficiently transmit power depending on the coupling degree between the primary resonance coil 13 and the secondary resonance coil 22.

Further, in a case where the determination control section 160 includes an internal memory, for example, the following process may be performed. When the capacitance of the capacitor 132 is increased (swept) from the initial value in step S12, the value of the capacitance, which gives (corresponds to) the resonance point where the change rate "Δφt'" of the phase difference "Δφt" output from the phase comparison section 151 is zero degrees, may be stored in the internal memory. Further, when the feedback control is turned on in step S15, the capacitance, which is stored in the internal memory by the determination control section 160, is used to drive the driver 156, so that it becomes possible to operate at the resonance point from when the feedback control is started.

As described, when it becomes possible to operate at the resonance point from when the feedback control is started, the operating point is more likely to be attracted to the resonance point so that the operation in the feedback control is more stabilized.

Further, in the above description, a case is described where the feedback control is turned on when the coupling degree is determined to be the "weak coupling" in step S14. However, when it is sufficient to determine the coupling degree (coupling condition), the flow may be terminated when the determination is finished in step S14. In this case, it is possible to provide the power transmission apparatus 100 which determines the coupling degree.

Further, in the above description, a case is described where the resonance frequency of the primary resonance coil 13 and the secondary resonance coil 22 is adjusted by changing the capacitance of the capacitor 132 which is connected to both ends of the primary resonance coil 13. Note that, however, it is possible to adjust the resonance frequency of the primary resonance coil 13 and the secondary resonance coil 22 without using the capacitor 132.

Figure 13:
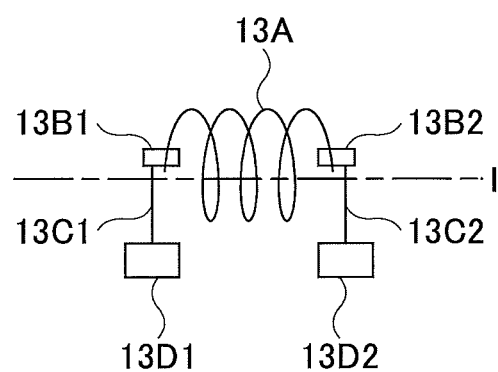
FIG. 13 illustrates a primary resonance coil 13A according to a modified example of the first embodiment.

FIG. 13 illustrates a primary resonance coil 13A according to a modified example of the first embodiment. Here, the primary resonance coil 13A is a helical coil and differs from the primary resonance coil 13 which includes the one-turn coil 131 and the capacitor 132 (see FIGS. 2 and 3) in that the capacitance can be adjusted by changing the distance between the windings of the helical coil.

The primary resonance coil 13A is supported by supporting parts 13B1 and 13B2. Further, the supporting parts 13B1 and 13B2 are fixed to drive parts 13D1 and 13D2 via stays 13C1 and 13C2, respectively. The drive parts 13D1 and 13D2 are movably provided in a manner such that the distance between the drive parts 13D1 and 13D2 can be adjusted. The distance between the drive parts 13D1 and 13D2 can be adjusted by, for example, using a drive device such as a motor, so that the primary resonance coil 13A can be elongated or contracted in the coli axis "I". When the primary resonance coil 13A is elongated or contracted, the distance between the windings of primary resonance coil 13A changes, so that the floating capacitance is changed and thus the resonance frequency can be adjusted. That is, when the primary resonance coil 13A is contracted, the floating capacitance is increased, and when the primary resonance coil 13A is elongated, the floating capacitance is reduced.

As described above, the resonance frequency may be adjusted by elongating or contracting the primary resonance coil 13A. Further, one of the drive parts 13D1 and 13D2 may be fixed. Further, the distance between the drive parts 13D1 and 13D2 may be adjusted by any drive device other than a motor.

Second Embodiment

A power transmission apparatus according to a second embodiment differs from the power transmission apparatus 100 according to the first embodiment in that when it is determined that the coupling degree corresponds to the "strong coupling", the gain polarity of the feedback control section 144 is switched to the reversed (opposite) polarity and the feedback control is performed. The "strong coupling" is an example of the second coupling degree.

The power transmission apparatus according to the second embodiment has a configuration similar to that of the power transmission apparatus 100 according to the first embodiment of FIGS. 2 and 3, expect that only the control by the determination control section 160 differs from that by the power transmission apparatus 100 according to the first embodiment.

Due to this, in the following description, the difference is described with reference to the flowchart in FIG. 14 and using FIGS. 1 through 11 as references.

Figure 14:
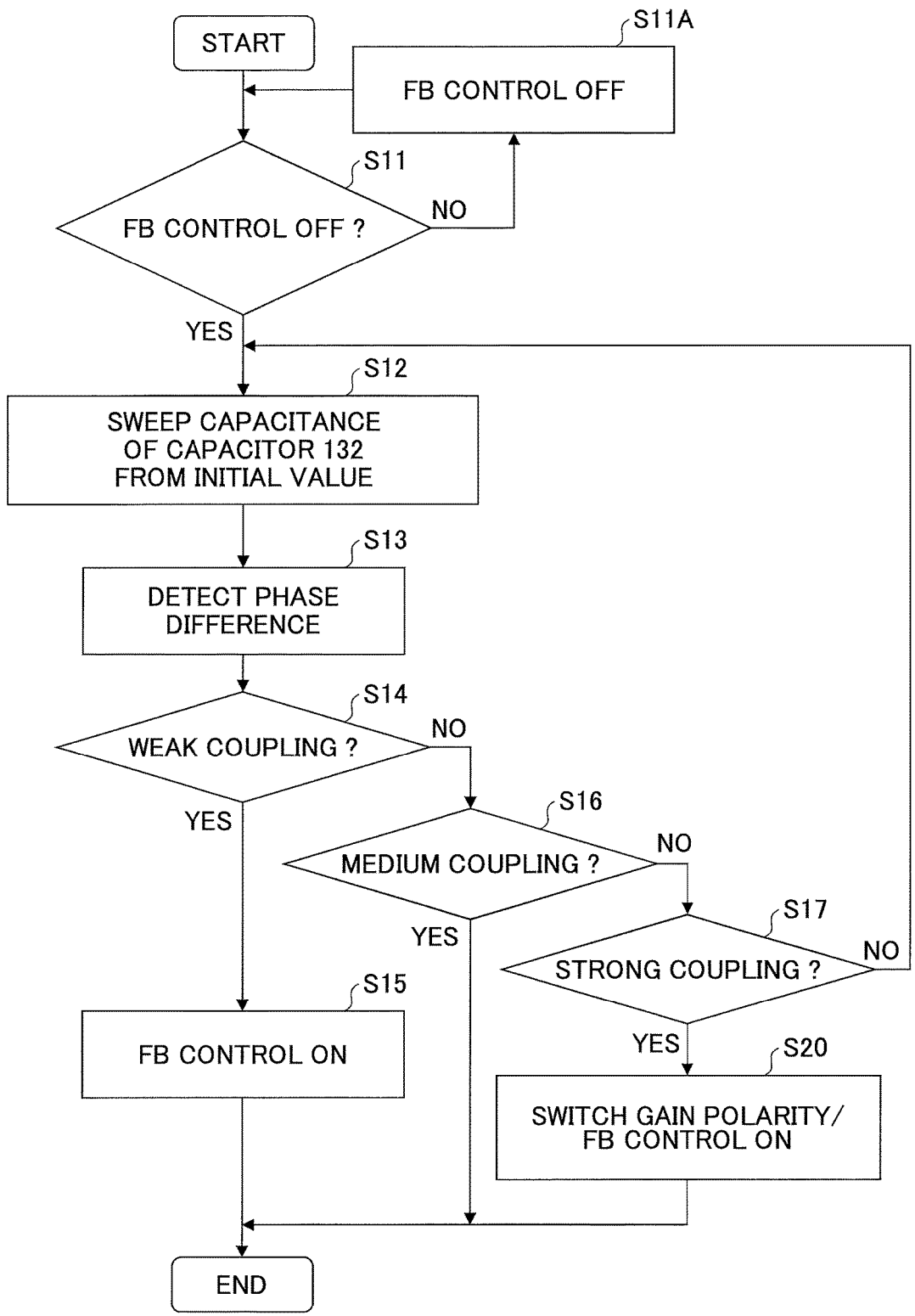
FIG. 14 is a flowchart of an example process executed by the determination control section 160 of a power transmission apparatus according to a second embodiment.

FIG. 14 is a flowchart of an example process performed by the determination control section 160 of the power transmission apparatus according to the second embodiment.

Steps S1 through S17 of FIG. 14 are the same as steps S1 through S17 of the power transmission apparatus 100 according to the first embodiment in FIG. 12. Therefore, the repeated descriptions thereof are herein omitted.

In step S17, when determining that the coupling degree corresponds to the "strong coupling" (YES in step S17), the determination control section 160 switches the gain polarity to the opposite polarity and then inputs the ON signal to the compensation section 155 to perform the feedback control by the feedback control section 144 (step S20).

By switching the gain polarity of the gain adjustment section 154 to the opposite characteristics, the determination control section 160 switches the gain polarity of the feedback control section 144 to the opposite polarity. The switching the gain polarity of the feedback control section 144 to the opposite polarity can be realized by multiplying the gain of the gain adjustment section 154 in the first embodiment by "−1".

As a result, after the gain polarity of the feedback control section 144 is switched to the opposite polarity, under the state of the "strong coupling", it becomes possible to perform the feedback control in both power transmission side and the power receiving side and transmit power at the most appropriate operating point.

As described above, according to the second embodiment, it becomes possible to provide a power transmission apparatus that can effectively transmit power depending on the coupling degree between the primary resonance coil 13A and the secondary resonance coil 22.

Third Embodiment

A power transmission apparatus according to a third embodiment differs from the power transmission apparatus 100 according to the first embodiment in that when it is determined that the coupling degree is the "medium coupling" or the "strong coupling", the feedback control is performed while reducing the kQ product between the power transmission system coil "TC", which includes the primary coil 12 and the primary resonance coil 13, and the power receiving system coil "RC" which includes the secondary resonance coil 22 and the secondary coil 23.

The power transmission apparatus according to the third embodiment has a configuration similar to that of the power transmission apparatus 100 according to the first embodiment of FIGS. 2 and 3, except that only the control by the determination control section 160 differs from that by the power transmission apparatus 100 according to the first embodiment.

Due to this, in the following description, the difference is described with reference to the flowchart in FIG. 15 and using FIGS. 1 through 11 as references.

Figure 15:
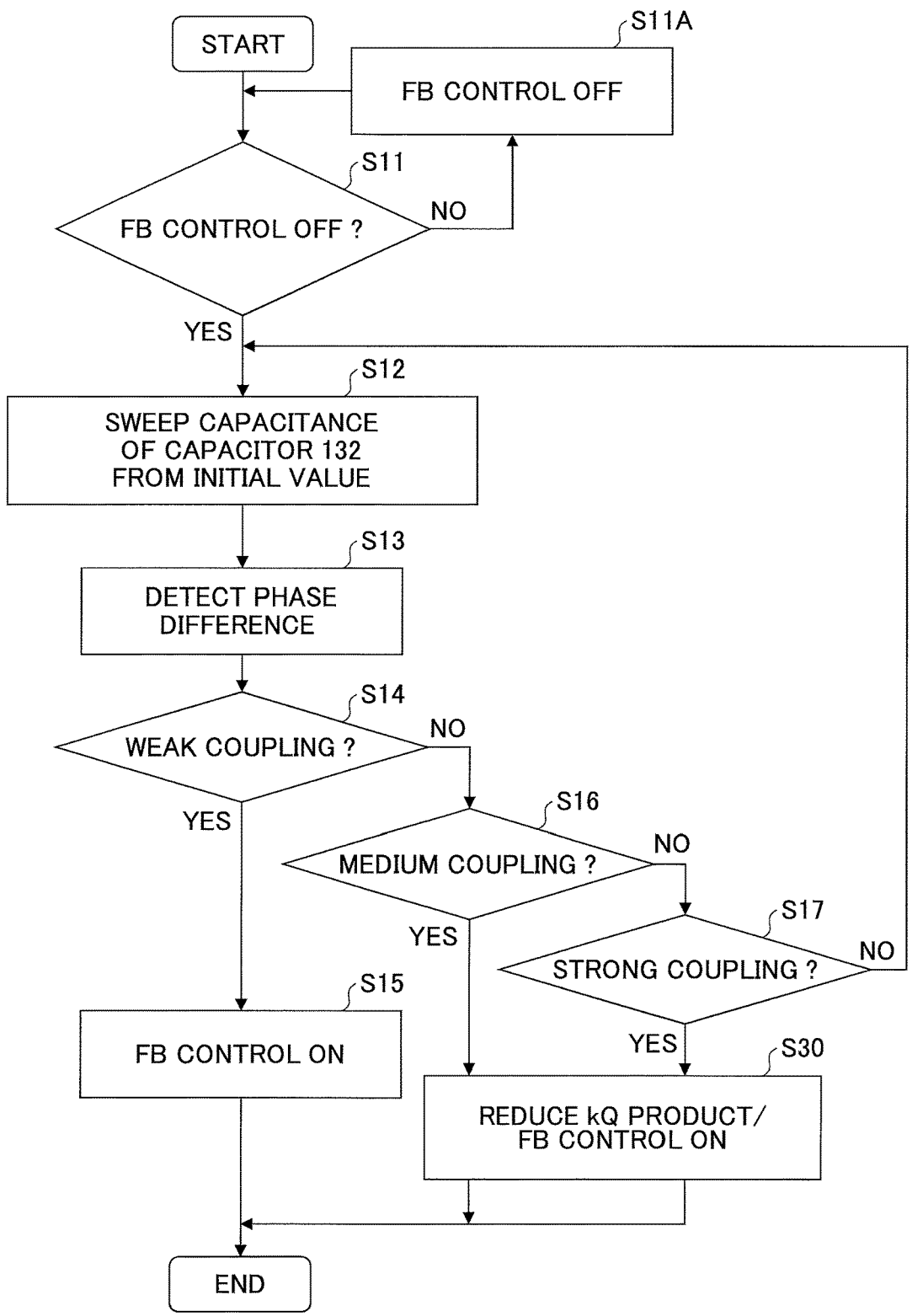
FIG. 15 is a flowchart of an example process executed by the determination control section 160 of a power transmission apparatus according to a third embodiment.

FIG. 15 is a flowchart of an example process performed by the determination control section 160 of the power transmission apparatus according to the third embodiment.

Steps S1 through S17 of FIG. 15 are the same as steps S1 through S17 of the power transmission apparatus 100 according to the first embodiment in FIG. 12. Therefore, the repeated descriptions thereof are herein omitted.

When the coupling degree is determined as the "medium coupling" in step S16 (YES in step S16), the determination control section 160 reduces the kQ product and then inputs the ON signal to the compensation section 155 to perform the feedback control by the feedback control section 144 (step S30).

More specifically, the determination control section 160 reduces the kQ product between the power transmission system coil "TC" and the power receiving system coil "RC", and then, under the "medium coupling" state, the feedback control is performed both on the power transmission side and the power receiving side, so that the power is transmitted on the most appropriate operating point.

Further, similar to the case where the coupling degree is determined as the "medium coupling" in step S16 (YES in step S16), in the case where the degree is determined as the "strong coupling" in step S17 (YES in step S17) as well, the determination control section 160 reduces the kQ product and then inputs the ON signal to the compensation section 155 to perform the feedback control by the feedback control section 144 (step S30).

As described above, according to the third embodiment, it becomes possible to provide a power transmission apparatus that can effectively transmit power depending on the coupling degree between the primary resonance coil 13 and the secondary resonance coil 22.

Further, the reduction of kQ product can be realized by, for example, the following method.

Figure 16:
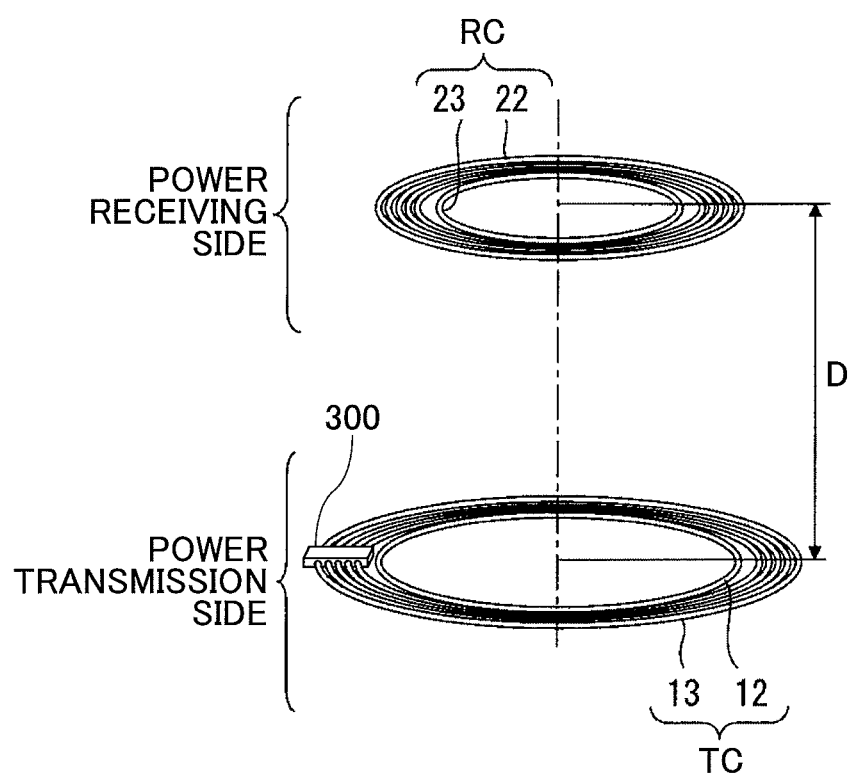
FIG. 16 illustrates an example configuration of a primary coil 12, the primary resonance coil 13, the secondary resonance coil 22, and a secondary coil 23 of the power transmission apparatus according to the third embodiment.

FIG. 16 illustrates an example configuration of the primary coil 12, the primary resonance coil 13, the secondary resonance coil 22, and the secondary coil 23 of the power transmission apparatus according to the third embodiment. For example, the kQ product is reduced by providing an element 300 on the primary resonance coil 13. For example, the element 300 is a variable resistor inserted in series with the primary resonance coil 13 or a tap provided on the primary resonance coil 13.

When the resistance value of the variable resistor which is inserted in series with the primary resonance coil 13 is increased, the Q value can be increased. On the other hand, when the resistance value of the variable resistor is reduced, the Q value can be reduced.

Further, the tap, which is provided on the primary resonance coil 13, is an element that can change the substantial number of turns of the primary resonance coil 13 which is used to transmit power by magnetic field resonance, and is provided to change the coupling coefficient "k". For example, the tap is provided at the midpoint of the primary resonance coil 13, so that by switching the tap by the determination control section 160, the substantial number of turns of the primary resonance coil 13 which is used to transmit power by magnetic field resonance can be switched to 10 turns or 5 turns. By doing this, the coupling coefficient "k" can be changed (selected).

As described above, by changing the Q value or the coupling coefficient "k" by using the element 300, the kQ product can be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions has been described in detail, it is to be understood that various changes, substitutions, and alterations could be made hereto without departing from the sprit and scope of the invention.

What is claimed is:

1. A power transmission apparatus comprising:
a primary coil connected to an AC source;
a primary resonance coil configured to receive power from the primary coil by electromagnetic induction;
a secondary resonance coil configured to receive power from the primary resonance coil by magnetic field resonance occurred between the primary resonance coil and the secondary resonance coil;
a secondary coil configured to receive power from the secondary resonance coil by electromagnetic induction;
a variable capacitor attached to the primary resonance coil;
a phase comparison section configured to output a phase difference between a phase of voltage which is supplied to the primary resonance coil and a phase of current which flows through the primary resonance coil;
a memory; and
a processor coupled to the memory and configured to perform a process including:
detecting a phase difference between the phase of the voltage and the phase of the current output from the phase comparison section; and
determining a coupling degree between the primary resonance coil and the secondary resonance coil based on a change degree of the phase difference relative to a change amount of capacitance upon changing the capacitance of the variable capacitor;
wherein the determining includes determining that the coupling degree between the primary resonance coil and the secondary resonance coil is less than or equal to a first coupling degree, when the change degree of the phase difference relative to the change amount of the capacitance upon increasing the capacitance of the variable capacitor indicates a delay which is greater than or equal to a first delay degree.

2. The power transmission apparatus as claimed in claim 1, wherein the process further includes:
performing feedback control so that a resonance current flows through the primary resonance coil by controlling the capacitance of the variable capacitor based on the phase difference; and
performing the feedback control by controlling the capacitance of the variable capacitor based on the phase difference in response to a determination that the coupling degree between the primary resonance coil and the secondary resonance coil is less than or equal to the first coupling degree.

3. The power transmission apparatus as claimed in claim 2, wherein the primary resonance coil is telescopicable and functions as the variable capacitor by being telescopically extended or contracted, and
wherein the process further includes controlling the capacitance of the primary resonance coil by setting a length of the primary resonance coil.

4. The power transmission apparatus as claimed in claim 2, wherein the process further includes:
determining that the coupling degree between the primary resonance coil and the secondary resonance coil is greater than the first coupling degree, when the change degree of the phase difference relative to the change amount of the capacitance upon increasing the capacitance of the variable capacitor is less than the first delay degree; and
selecting a control mode in which the feedback control is not performed in response to a determination that the coupling degree between the primary resonance coil and the secondary resonance coil is greater than the first coupling degree.

5. The power transmission apparatus as claimed in claim 2, wherein the process further includes:
determining whether the coupling degree between the primary resonance coil and the secondary resonance coil is greater than or equal to a second coupling degree which is greater than the first coupling degree, when the change degree of the phase difference relative to the change amount of the capacitance upon increasing the capacitance of the variable capacitor is less than the first delay degree; and
performing the feedback control in a state where a polarity of a gain of a feedback system for performing the feedback control is converted to an opposite polarity, in response to a determination that the coupling degree between the primary resonance coil and the secondary resonance coil is greater than or equal to the second coupling degree.

6. The power transmission apparatus as claimed in claim 2, wherein the process further includes performing the feedback control in a state where a kQ product is reduced, in response to a determination that the coupling degree between the primary resonance coil and the secondary resonance coil is greater than or equal to the first coupling degree.

7. The power transmission apparatus as claimed in claim 6, further comprising an element which is attached to the primary resonance coil,
   wherein the process further includes reducing a coupling coefficient "k" value or a "Q" value by switching the element.

8. The power transmission apparatus as claimed in claim 1,
   wherein the variable capacitor is a variable capacitance element which is connected to the primary resonance coil.

9. The power transmission apparatus as claimed in claim 8,
   wherein the variable capacitance element is connected between both ends of the primary resonance coil.

10. A method for transmitting power in a power transmission apparatus including a primary coil connected to an AC source, a primary resonance coil configured to receive power from the primary coil by electromagnetic induction, a secondary resonance coil configured to receive power from the primary resonance coil by magnetic field resonance occurred between the primary resonance coil and the secondary resonance coil, a secondary coil configured to receive power from the secondary resonance coil by electromagnetic induction, and a variable capacitor attached to the primary resonance coil, the method comprising:
   detecting a phase difference between a phase of voltage which is supplied to the primary resonance coil and a phase of current which flows through the primary resonance coil; and
   determining a coupling degree between the primary resonance coil and the secondary resonance coil based on a change degree of the phase difference relative to a change amount of capacitance upon changing the capacitance of the variable capacitor,
   wherein the determining includes determining that the coupling degree between the primary resonance coil and the secondary resonance coil is less than or equal to a first coupling degree, when the change degree of the phase difference relative to the change amount of the capacitance upon increasing the capacitance of the variable capacitor indicates a delay which is greater than or equal to a first delay degree.

\* \* \* \* \*